US012374809B2

(12) United States Patent
Zhang et al.

(10) Patent No.: US 12,374,809 B2
(45) Date of Patent: Jul. 29, 2025

(54) ANTENNA STRUCTURE, ELECTRONIC DEVICE, AND WIRELESS NETWORK SYSTEM

(71) Applicants: Honor Device Co., Ltd., Shenzhen (CN); TSINGHUA UNIVERSITY, Beijing (CN)

(72) Inventors: Xiaopeng Zhang, Beijing (CN); Zhijun Zhang, Shenzhen (CN); Dawei Zhou, Shenzhen (CN)

(73) Assignees: Honor Device Co., Ltd., Shenzhen (CN); TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/274,465

(22) PCT Filed: Dec. 28, 2022

(86) PCT No.: PCT/CN2022/142628

§ 371 (c)(1),
(2) Date: Jul. 27, 2023

(87) PCT Pub. No.: WO2023/138324

PCT Pub. Date: Jul. 27, 2023

(65) Prior Publication Data

US 2024/0097348 A1 Mar. 21, 2024

(30) Foreign Application Priority Data

Jan. 18, 2022 (CN) ......................... 202210056873.9

(51) Int. Cl.
*H01Q 21/06* (2006.01)
*H01Q 9/04* (2006.01)
*H01Q 21/00* (2006.01)

(52) U.S. Cl.
CPC ......... *H01Q 21/065* (2013.01); *H01Q 9/0457* (2013.01); *H01Q 21/0075* (2013.01)

(58) Field of Classification Search
CPC ............... H01Q 21/065; H01Q 9/0457; H01Q 21/0075; H01Q 1/2291; H01Q 5/30;
(Continued)

(56) References Cited

U.S. PATENT DOCUMENTS 5,661,494 A 8/1997 Bondyopadhyay
9,391,375 B1 * 7/2016 Bales ................... H01Q 21/064
2024/0266751 A1 * 8/2024 Du ..................... H01Q 21/0075

FOREIGN PATENT DOCUMENTS

CN 102163766 A 8/2011
CN 105870619 A 8/2016
(Continued)

OTHER PUBLICATIONS

Zhang et al., "S-band Dual Circularly Polarized Microstrip Patch Antenna Array for Satellite Communication," 2017 Sixth Asia-Pacific Conference on Antennas and Propagation (APCAP), Xi'an, China, 3 pages (Oct. 16-19, 2017).

*Primary Examiner* — David E Lotter
(74) *Attorney, Agent, or Firm* — Leydig, Voit & Mayer, Ltd.

(57) ABSTRACT

An antenna structure, an electronic device, and a wireless network system are provided, and relate to the field of antenna technologies. A patch antenna array includes four patch antennas. The four patch antennas are arranged in two rows and two columns. One of the feeding structures is included between two of the patch antennas in each row. One of the feeding structures is included between two of the patch antennas in each column. The feeding structure located between the two patch antennas in each column is connected to the first feeding port, so that the four patch antennas all generate polarization in a first direction. The
(Continued)

feeding structure located between the two patch antennas in each row is connected to the second feeding port, so that the four patch antennas all generate polarization in a second direction.

20 Claims, 15 Drawing Sheets

(58) Field of Classification Search
CPC .......... H01Q 21/24; H01Q 1/002; H01Q 1/22; H01Q 21/0006; H04L 45/60
See application file for complete search history.

(56) References Cited

FOREIGN PATENT DOCUMENTS

| | | | |
|---|---|---|---|
| CN | 106356644 | A | 1/2017 |
| CN | 107394378 | A | 11/2017 |
| CN | 210723373 | U | 6/2020 |
| CN | 111883906 | A | 11/2020 |
| CN | 212587718 | U | 2/2021 |
| CN | 112688059 | A | 4/2021 |
| CN | 113328255 | A | 8/2021 |
| CN | 113506982 | A | 10/2021 |
| CN | 114883773 | A | 8/2022 |

* cited by examiner

ANTENNA STRUCTURE, ELECTRONIC DEVICE, AND WIRELESS NETWORK SYSTEM

CROSS-REFERENCE TO RELATED APPLICATIONS

This application is a national stage of International Application No. PCT/CN2022/142628, filed on Dec. 28, 2022, which claims priority to Chinese Patent Application No. 202210056873.9, filed on Jan. 18, 2022. The disclosures of both of the aforementioned applications are hereby incorporated by reference in their entireties.

STATEMENT OF JOINT RESEARCH AGREEMENT

The subject matter and the claimed invention were made by or on the behalf of Tsinghua University, of Haidian District, Beijing, P.R. China and Honor Device Co., Ltd., of Shenzhen, Guangdong Province, P.R. China, under a joint research agreement. The joint research agreement was in effect on or before the claimed invention was made, and that the claimed invention was made as a result of activities undertaken within the scope of the joint research agreement.

TECHNICAL FIELD

This application relates to the field of antenna technologies, and in particular, to an antenna structure, an electronic device, and a wireless network system.

BACKGROUND

Currently, antennas may be classified into an omnidirectional antenna and a directional antenna according to different signal radiation directions. The omnidirectional antenna radiates evenly around and has no direction. Compared with the omnidirectional antenna, the directional antenna can radiate within a certain range of angles, and thus has higher gain in a specific direction.

In a typical application scenario, the directional antenna is applicable to a router, and the problem of a poor signal caused by attenuation of the signal due to wall penetration can be addressed by using the characteristic that the directional antenna has higher gain in a specific direction. A common design scheme of the directional antenna is a dipole antenna with a reflector, a patch antenna, or an electromagnetic dipole antenna. The dipole antenna with the reflector is generally used in a base station antenna, and generally has gain that is around 8 dB, which is relatively low. The electromagnetic dipole antenna generally requires a multilayer printed circuit board (PCB) or a three-dimensional metal structure, which is costly and is difficult to machine. Compared with the electromagnetic dipole antenna, the patch antenna is simple in structure, but the current patch antenna has limited gain and low practicability.

SUMMARY

To address the above problems, this application provides an antenna structure, an electronic device, and a wireless network system, which are simple in structure and have higher directional gain.

According to a first aspect, this application provides an antenna structure. The antenna structure includes a dielectric plate, a metal bottom plate, a patch antenna array, a first feeding port, a second feeding port, and four feeding structures. The dielectric plate and the metal bottom plate are spaced apart at a first preset distance. The first feeding port and the patch antenna array are located on a first surface of the dielectric plate. The second feeding port is located on a second surface of the dielectric plate. The second surface is opposite the first surface. The patch antenna array includes four patch antennas. The four patch antennas are arranged in two rows and two columns. One of the feeding structures is included between two of the patch antennas in each row. One of the feeding structures is included between two of the patch antennas in each column. The feeding structure located between the two patch antennas in each column is connected to the first feeding port, so that the four patch antennas all generate polarization in a first direction. The feeding structure located between the two patch antennas in each row is connected to the second feeding port, so that the four patch antennas all generate polarization in a second direction.

In the solution provided in this application, gain is increased by adopting the patch antenna array, and the antenna structure realizes excitation of the four patch antennas by using only two feeding ports. A feeding circuit has a simple structure, and the feeding circuit has low design complexity. In addition, the feeding structure can be directly designed on the dielectric plate where the patch antennas are located, so that all feeding circuits and patch antennas can be realized on a same dielectric plate, which can effectively reduce complexity of the antenna structure and reduce the cost of the antenna structure.

In a possible implementation, the first direction is orthogonal to the second direction.

In this case, the four patch antennas achieve orthogonal polarization, so the antenna structure has good directionality.

In a possible implementation, the antenna structure further includes the metal bottom plate; and the dielectric plate and the metal bottom plate are spaced apart at the first preset distance. The first preset distance may be determined according to a bandwidth of the antenna structure during operation, which is not specifically limited in this application.

In a possible implementation, each of the four feeding structures includes a dipole and a set of parallel feed lines that are connected. The parallel feed lines include a first feed line located on the first surface and a second feed line located on the second surface. The second feed line included in the feeding structure between the two patch antennas in each column is connected to the first surface through a corresponding through structure. The first feed line included in the feeding structure between the two patch antennas in each row is connected to the second surface through a corresponding through structure.

In a possible implementation, the through structure includes one or more vias, each of the one or more vias being filled or plated with a conductive medium.

In a possible implementation, the four feeding structures specifically include a first feeding structure, a second feeding structure, a third feeding structure, and a fourth feeding structure.

The first feeding structure is located between the two patch antennas in the first column, the second feeding structure is located between the two patch antennas in the first row, the third feeding structure is located between the two patch antennas in the second column, and the fourth feeding structure is located between the two patch antennas in the second row. The first feed line of the first feeding structure is connected to the first feed line of the third feeding structure. The second feed line of the first feeding structure is connected to the first surface through a first through structure, and the second feed line of the third feeding structure is connected to the first surface through a third through structure. The first through structure and the third through structure are connected on the first surface. The second feed line of the second feeding structure is connected to the second feed line of the fourth feeding structure. The first feed line of the second feeding structure is connected to the second surface through a second through structure, and the first feed line of the fourth feeding structure is connected to the second surface through a fourth through structure. The second through structure and the fourth through structure are connected on the second surface.

In a possible implementation, the dipole of each of the feeding structures includes: a first portion and a second portion. The first portion is located on the first surface, a first end of the first portion is connected to the first feed line, the first end of the first portion is a first input terminal of the dipole, a second end of the first portion includes a first branch, and the first branch and the patch antenna closest thereto are spaced apart at a second preset distance. The second portion is located on the second surface, a first end of the second portion is connected to the second feed line, the first end of the second portion is a second input terminal of the dipole, a second end of the second portion includes a second branch, and the second branch and the patch antenna closest thereto are spaced apart at the second preset distance.

Magnitude of series capacitance between the patch antenna and the dipole may be adjusted by adjusting a length of the second preset distance. In actual adjustment, the shorter the second preset distance, the higher a capacitance value of an equivalent series capacitor.

The magnitude of the series capacitance between the patch antenna and the dipole may also be adjusted by adjusting widths of the first branch and the second branch. In actual adjustment, the longer the widths of the first branch and the second branch, the higher the capacitance value of the equivalent series capacitor.

In a possible implementation, input impedance of the dipole is a first impedance value, the input impedance of the dipole is impedance between the first input terminal and the second input terminal, and an impedance value between the first feed line and the second feed line in each set of the parallel feed lines is the first impedance value, so as to implement impedance matching.

In a possible implementation, each of the four feeding structures includes a dipole and a set of parallel slot lines that are connected. The parallel slot lines included in the feeding structure between the two patch antennas in each column are both located on the first surface. The parallel slot lines included in the feeding structure between the two patch antennas in each row are both located on the second surface.

In a possible implementation, the four feeding structures specifically include a first feeding structure, a second feeding structure, a third feeding structure, and a fourth feeding structure. The first feeding structure is located between the two patch antennas in the first column, the second feeding structure is located between the two patch antennas in the first row, the third feeding structure is located between the two patch antennas in the second column, and the fourth feeding structure is located between the two patch antennas in the second row. A first slot line of the first feeding structure is connected to a first slot line of the third feeding structure. A second slot line of the first feeding structure is connected to a second slot line of the third feeding structure. A first slot line of the second feeding structure is connected to a first slot line of the fourth feeding structure. A second slot line of the second feeding structure is connected to a second slot line of the fourth feeding structure.

In a possible implementation, the dipole of each of the feeding structures includes: a first portion and a second portion. The first portion and the second portion are located on a same surface. A first end of the first portion is connected to the first slot line, the first end of the first portion is a first input terminal of the dipole, a second end of the first portion includes a first branch, and the first branch and the patch antenna closest thereto are spaced apart at a second preset distance. A first end of the second portion is connected to the second slot line, the first end of the second portion is a second input terminal of the dipole, a second end of the second portion includes a second branch, and the second branch and the patch antenna closest thereto are spaced apart at the second preset distance.

In a possible implementation, input impedance of the dipole is a first impedance value, the input impedance of the dipole is impedance between the first input terminal and the second input terminal, and an impedance value between the first slot line and the second slot line in each set of the parallel feed lines is the first impedance value, so as to implement impedance matching. In a possible implementation, the first branch and the second branch are T-shaped branches; or the first branch and the second branch are triangular branches; or the first branch and the second branch are semicircular branches.

In a possible implementation, the patch antennas included in the patch antenna array are square patch antennas; or the patch antennas included in the patch antenna array are circular patch antennas; or the patch antennas included in the patch antenna array are rhombic patch antennas.

In a possible implementation, the first surface and the second surface of the dielectric plate are squares, and side lengths of the first surface and the second surface are both a first preset length. A distance between geometric centers of the two patch antennas in a same column is a second preset length, and a distance between geometric centers of the two patch antennas in a same row is the second preset length. The second preset length is half of the first preset length.

According to a second aspect, this application further provides an electronic device. The electronic device includes one or more antenna structures provided in the above implementations, and further includes a first radio-frequency circuit. The antenna structure(s) is/are connected to the first radio-frequency circuit.

The antenna structure provided in the above implementations is applied to the electronic device. In the antenna structure, the four patch antennas are excited by dipole coupled feeding. For single polarization, the excitation of the four patch antennas conventionally requires four ports, and correspondingly, the feeding circuit is a one-to-four structure. However, by use of the technical solution of this application, for single polarization, the excitation of the four patch antennas requires only two feeding structures, and correspondingly, the feeding circuit is a one-to-two structure. Therefore, design complexity of the feeding circuit is reduced. Moreover, the dipole is connected to two parallel feed lines, and the two parallel feed lines can be directly designed on the dielectric plate where the patch antennas are located, so that all feeding circuits and patch antennas can be realized on a same dielectric plate, which can effectively reduce complexity of the antenna structure and reduce the cost of the antenna structure. That is, the cost of the electronic device is reduced. In addition, the antenna structure is directional, has high directional gain, has a high degree of isolation between the two feeding ports, and can also cover a wide frequency band range, for example, both a 5 GHz frequency band and a 6 GHz frequency band of Wi-Fi 6 and Wi-Fi 6E. Therefore, practicability is higher, and a quantity of antennas disposed on the electronic device can be reduced, to further reduce the cost of the electronic device.

In a possible implementation, the electronic device includes a plurality of antenna structures, at least two of the plurality of antenna structures having different operating frequency bands.

In a possible implementation, the electronic device is a router.

According to a third aspect, this application further provides a wireless network system. The wireless network system includes one or more electronic devices provided in the above embodiments.

The antenna structure provided in this application is applied to the electronic device(s) in the wireless network system. On the one hand, the cost of the electronic device(s) is saved. On the other hand, gain of the electronic device(s) in a specific direction is increased. Therefore, signal quality and network stability of the wireless network system are improved.

In a possible implementation, the wireless network system further includes one or more second electronic devices including an omnidirectional antenna.

DESCRIPTION OF EMBODIMENTS

In the specification, claims, and accompanying drawings of this application, the terms "first", "second", "third", and so on are intended to distinguish different objects but do not indicate a particular order.

To make a person skilled in the art better understand technical solutions in this application, an application scenario of the technical solutions in this application is first introduced below.

The solutions provided in this application are applied to an electronic device provided with an antenna. A type of the electronic device is not specifically limited in this application. The electronic device may be a mobile phone, a notebook computer, a wearable device (such as a smart watch), a tablet computer, an augmented reality (AR) device, a virtual reality (VR) device, a router device, an in-vehicle device, or the like. A description is provided below based on an example in which the electronic device is a router.

Figure 1A:
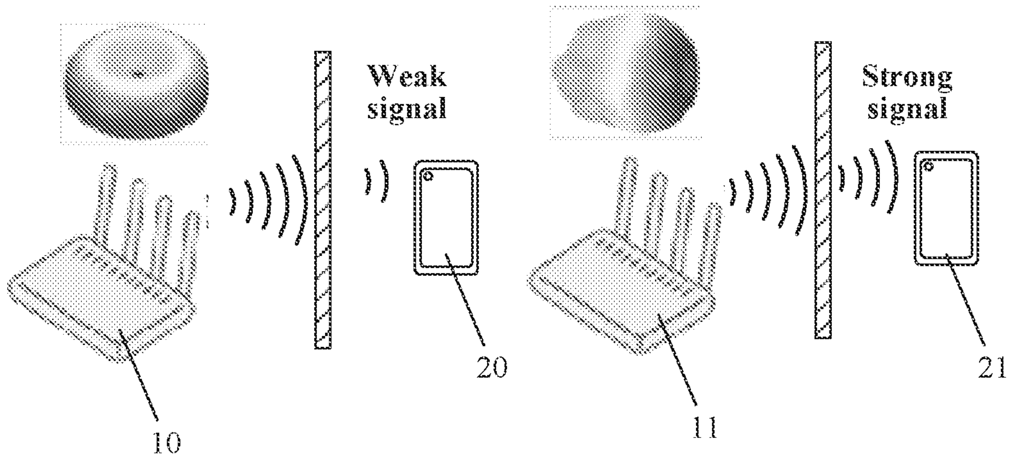
FIG. 1A is a first schematic diagram of a scenario according to an embodiment of this application.

Refer to FIG. 1A which is a first schematic diagram of a scenario according to an embodiment of this application.

In FIG. 1A, a router 10 uses an omnidirectional antenna and is located on a left side of a wall, and a terminal device 20 is located on a right side of the wall. Since the omnidirectional antenna radiates evenly around and does not have high gain in a specific direction, after a signal passes through the wall and attenuates, the signal received by the terminal device 20 on the right side of the wall is relatively weak.

In FIG. 1A, a router 20 uses a directional antenna and is located on a right side of a wall, and a terminal device 21 is located on a right side of the wall. Since the omnidirectional antenna has higher gain in a specific direction, even if the signal passes through the wall and attenuates, the terminal device 20 on the right side of the wall can still receive a relatively strong signal.

Figure 1B:
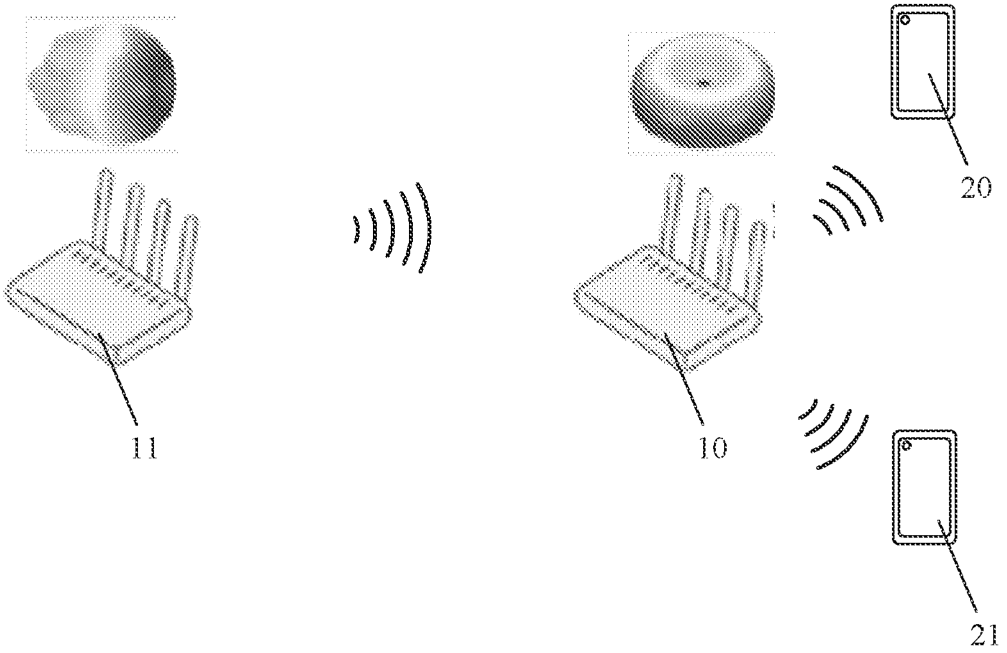
FIG. 1B is a second schematic diagram of a scenario according to an embodiment of this application.

Refer to FIG. 1B which is a second schematic diagram of a scenario according to an embodiment of this application.

When a router 11 and a router 12 form a wireless network system, the router 11 uses a directional antenna to send a signal to the router 12, and the router 12 may use an omnidirectional antenna to communicate with surrounding terminal devices 20 and 21. In this case, since the omnidirectional antenna has higher gain in a specific direction, stability of the signal sent by the router 11 to the router 12 is ensured, and a layout position of the router 11 can be more free. Even partition arrangement can be realized.

It may be understood that the router form in FIG. 1A and FIG. 1B is only a possible implementation, and does not constitute a limitation on the technical solutions of this application.

To sum up, the use of the directional antenna in the above scenarios can significantly improve user experience. Currently, a design scheme of the directional antenna is a dipole antenna with a reflector, a patch antenna, or an electromagnetic dipole antenna. The dipole antenna with the reflector is generally used in a base station antenna, and generally has gain that is around 8 dB, which is relatively low. The electromagnetic dipole antenna generally requires a multi-layer PCB or a three-dimensional metal structure, which is costly and is difficult to machine. Compared with the electromagnetic dipole antenna, the patch antenna is simple in structure. However, the current patch antenna has limited gain, and a patch antenna array needs to be used to increase the gain. The patch antenna array requires a plurality of feeding ports to perform in-phase feeding on the patch antennas at a same position to generate directional radiation. Therefore, an additional feeding circuit needs to be designed, and the practicability is low.

To address the above technical problems, this application provides an antenna structure, an electronic device, and a wireless network system. The antenna structure is simple in structure and has higher directional gain, which is specifically described below with reference to the accompanying drawings.

The terms such as “first” and “second” used in the description of this application are for descriptive purposes only, and shall not be understood as indication or implication of relative importance or implicit indication of a quantity of indicated technical features.

It may be understood that orientation names such as “up”, “down”, “left”, and “right” in the following embodiments of this application are only for convenience of description and need to refer to the directions in the accompanying drawings, which do not constitute a limitation on the technical solutions of this application.

In this application, unless otherwise explicitly specified or defined, the term “connection” should be understood in a broad sense. For example, the “connection” may be a fixed connection, a detachable connection or an integral connection; or may be a direct electrical connection, or an indirect electrical connection through an intermediary.

For ease of description, a radio-frequency antenna in the following embodiments of this application is referred to as an antenna, and a printed circuit board (PBC) is referred to as a circuit board. Details are not described again below.

Figure 2:
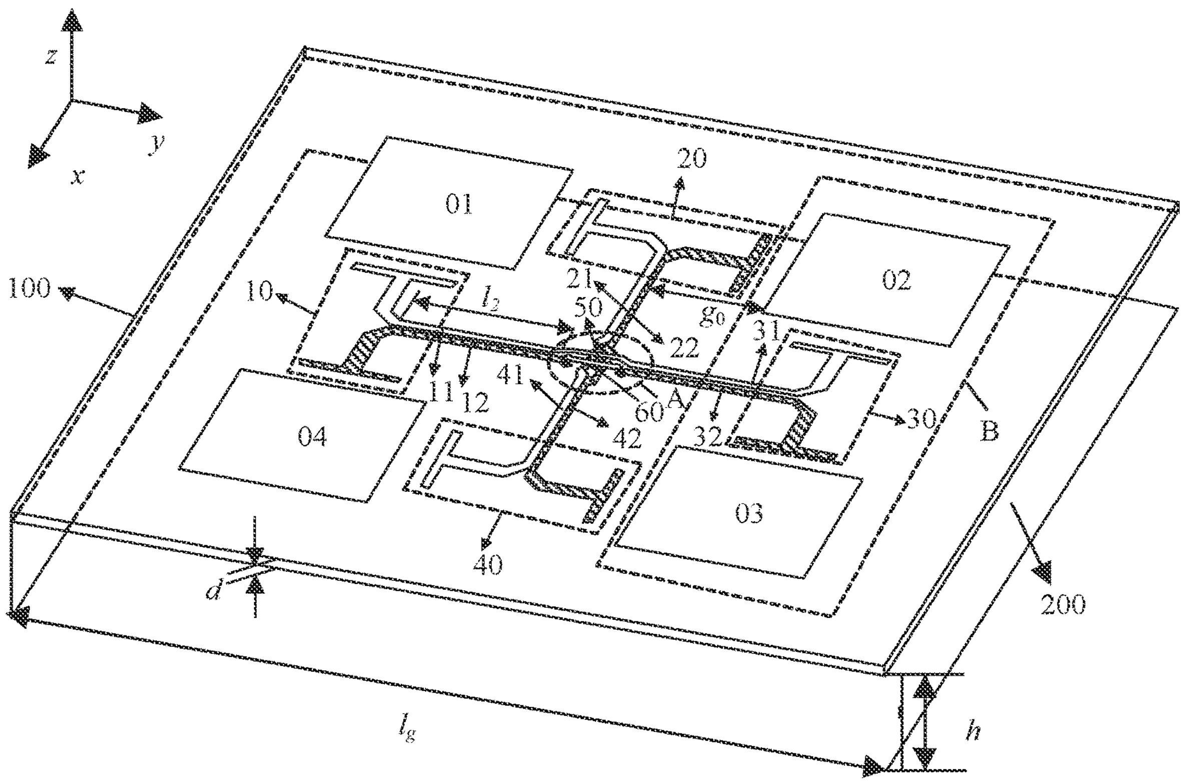
FIG. 2 is a schematic diagram of an antenna structure according to an embodiment of this application.

Refer to FIG. 2 which is a schematic diagram of an antenna structure according to an embodiment of this application.

The antenna structure includes: a dielectric plate 100, a metal bottom plate 200, a patch antenna array, a first feeding port 50, a second feeding port 60, and four feeding structures.

The dielectric plate 100 and the metal bottom plate 200 are spaced apart at a first preset distance h. A relative position between the dielectric plate and the metal bottom plate 200 is fixed. The metal bottom plate 200 serves as a grounding terminal of the antenna structure.

The patch antenna array includes patch antennas 01 to 04. The four patch antennas are arranged in two rows and two columns. One of the feeding structures is included between two of the patch antennas in each row. One of the feeding structures is included between two of the patch antennas in each column.

The first feeding port 50 and the patch antenna array are located on a first surface of the dielectric plate 100. The second feeding port 60 is located on a second surface of the dielectric plate. The second surface is opposite the first surface.

As shown in FIG. 2, the first surface is an upper surface of the dielectric plate 100, the second surface is a lower surface of the dielectric plate 100, and the second surface faces the metal bottom plate 200.

The feeding structure located between the two patch antennas in each column is connected to the first feeding port 50, so that the four patch antennas all generate polarization in a first direction. The first direction corresponds to a direction x shown in the figure.

The feeding structure located between the two patch antennas in each row is connected to the second feeding port, so that the four patch antennas all generate polarization in a second direction. The second direction corresponds to a direction y shown in the figure. The first direction is orthogonal to the second direction.

Specifically, a first feeding structure is located between the patch antenna 01 and the patch antenna 04 in the first column, and the first feeding structure includes a first dipole 10, a first feed line 11, and a second feed line 12. The first feed line 11 and the second feed line 12 of the first feeding structure are connected to the first feeding port 50.

A second feeding structure is located between the patch antenna 01 and the patch antenna 02 in the first row, and the second feeding structure includes a second dipole 20, a first feed line 21, and a second feed line 22. The first feed line 21 and the second feed line 22 of the second feeding structure are connected to the second feeding port 60.

A third feeding structure is located between the patch antenna 02 and the patch antenna 03 in the second column, and the third feeding structure includes a third dipole 30, a first feed line 31, and a second feed line 32. The first feed line 31 and the second feed line 32 of the third feeding structure are connected to the first feeding port 50.

A fourth feeding structure is located between the patch antenna 03 and the patch antenna 04 in the second row, and the fourth feeding structure includes a fourth dipole 40, a first feed line 41, and a second feed line 42. The first feed line 41 and the second feed line 42 of the fourth feeding structure are connected to the second feeding port 60.

The first feeding structure and the third feeding structure are configured to cause the patch antennas 01 to 04 to generate polarization in the first direction. The first direction corresponds to the direction x shown in the figure. The second feeding structure and the fourth feeding structure are configured to cause the patch antennas 01 to 04 to generate polarization in the second direction. The second direction corresponds to the direction y shown in the figure. The direction x and the direction y shown in the figure are orthogonal to each other.

By use of the solution provided in this embodiment of this application, gain is increased by adopting the patch antenna array, and the antenna structure uses only two feeding ports. A feeding circuit has a simple structure, and the feeding circuit has low design complexity. In addition, the feeding structure can be directly designed on the dielectric plate where the patch antennas are located, so that all feeding circuits and patch antennas can be realized on a same dielectric plate, which can effectively reduce complexity of the antenna structure and reduce the cost of the antenna structure.

An implementation of the antenna structure is specifically described below.

Still refer to the antenna structure shown in FIG. 2.

The antenna structure shown in FIG. 2 specifically includes a dielectric plate 100, a metal bottom plate 200, a patch antenna array, a first feeding structure, a second feeding structure, a third feeding structure, a fourth feeding structure, a first feeding port 50, and a second feeding port 60.

A specific material of the dielectric plate 100 is not limited in this embodiment of this application, which may be determined according to an actual situation.

In some embodiments, the dielectric plate 100 may be an epoxy glass fiber plate (epoxy plate) whose fire-resistant material grade is FR-4, and a dielectric constant of the dielectric plate is $\varepsilon_r$=4.4.

A thickness d of the dielectric plate 100 may be determined according to an actual situation, which is not specifically limited in this embodiment of this application.

The first preset distance h between the dielectric plate 100 and the metal bottom plate 200 may be determined according to a bandwidth of the antenna structure during operation, which is not specifically limited in this embodiment of this application.

The patch antenna array is located on a first surface of the dielectric plate 100.

The patch antenna array includes patch antennas 01 to 04. The above four patch antennas are arranged in a 2×2 manner. That is, the patch antenna array includes two rows, and each row includes two patch antennas. Moreover, the patch antenna array includes two columns, and each column includes two patch antennas. In the patch antenna array shown in FIG. 2, the first row includes the patch antenna 01 and the patch antenna 02, the second row includes the patch antenna 03 and the patch antenna 04, the first column includes the patch antenna 01 and the patch antenna 04, and the second column includes the patch antenna 02 and the patch antenna 03.

Implementation of the feeding structures are described first below. The following description is provided by taking the first feeding structure as an example. Implementations of other feeding structures are similar. Details are not described again.

Figure 3:
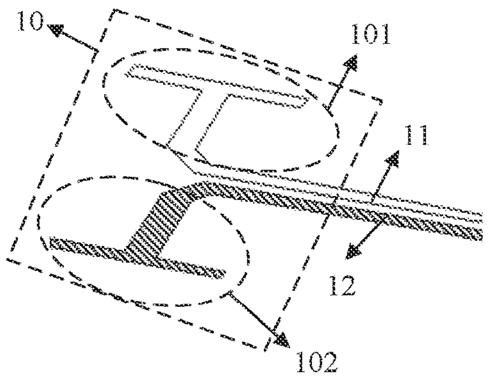
FIG. 3 is a schematic diagram of a feeding structure according to an embodiment of this application.

Refer to FIG. 3 which is a schematic diagram of a feeding structure according to an embodiment of this application.

The first feeding structure includes a first dipole 10, a first feed line 11, and a second feed line 12. The first dipole includes a first portion 101 and a second portion 102. The first portion 101 and the first feed line 11 are located on the first surface of the dielectric plate 100, and the second portion 102 and the second feed line 12 are located on the second surface of the dielectric plate 100. An input terminal of the first portion 101 is connected to the first feed line 11, and a tail end of the first portion 101 is spaced apart from the patch antenna 01 in FIG. 2 at a second preset distance. An input terminal of the second portion 102 is connected to the second feed line 12, and a tail end of the second portion 102 is spaced apart from the patch antenna 04 in FIG. 2 at the second preset distance.

The first feed line 11 and the second feed line 12 are a set of parallel lines.

Input impedance of an input terminal of the first dipole 10 is impedance between the first portion 101 and the second portion 102.

An implementation of the antenna structure is specifically described below with reference to the accompanying drawings.

Figure 4:
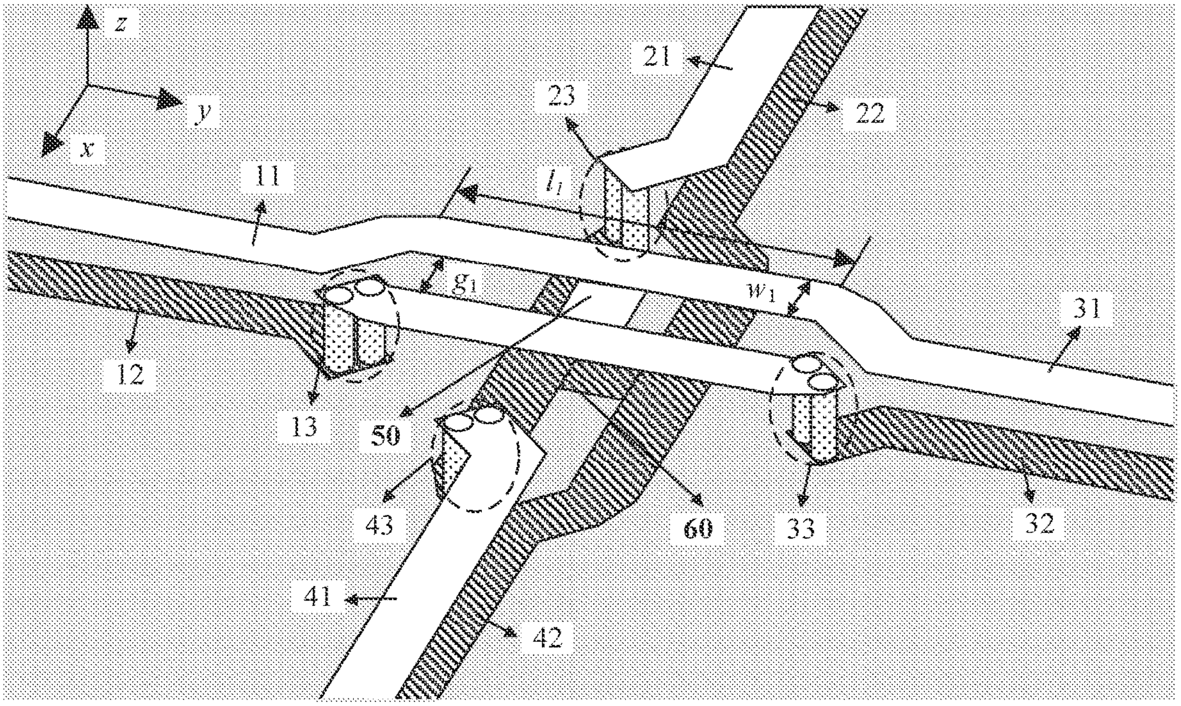
FIG. 4 is an enlarged view of Region A in FIG. 2 according to an embodiment of this application.

Refer to FIG. 2 and FIG. 4 together. FIG. 4 is an enlarged view of Region A in FIG. 2 according to an embodiment of this application.

The first feeding structure includes a first dipole 10, a first feed line 11, and a second feed line 12. The first feed line 11 is located on the first surface of the dielectric plate 100, a first end of the first feed line 11 is connected to the first feeding port 50, and a second end of the first feed line 11 is connected to a first portion of the first dipole 10. The second feed line 12 is located on the second surface of the dielectric plate 100. A first end of the second feed line 12 is connected to the first surface of the dielectric plate 100 through a first through structure 13 and then connected to the first feeding port 50 on the first surface. The first through structure 13 includes one or more vias filled or plated with a conductive medium. A quantity of the vias included in the first through structure 13 is not specifically limited in this embodiment of this application. An example in FIG. 4 is described based on an example in which the first through structure 13 includes two vias. A second end of the second feed line 12 is connected to a second portion of the first dipole 10.

The second feeding structure includes a second dipole 20, a first feed line 21, and a second feed line 22. The first feed line 21 is located on the first surface of the dielectric plate 100, and a first end of the first feed line 21 is connected to the second surface of the dielectric plate 100 through a second through structure 23 and then connected to the second feeding port 60 on the second surface. The second through structure 23 includes one or more vias filled or plated with a conductive medium. A quantity of the vias included in the second through structure 23 is not specifically limited in this embodiment of this application. An example in FIG. 4 is described based on an example in which the second through structure 23 includes two vias. A second end of the first feed line 21 is connected to a first portion of the second dipole 20. The second feed line 22 is located on the second surface of the dielectric plate 100, and a first end of the second feed line 22 is connected to the second feeding port 60 on the second surface of the dielectric plate 100. A second end of the second feed line 22 is connected to a second portion of the second dipole 20.

The third feeding structure includes a third dipole 30, a first feed line 31, and a second feed line 32. The first feed line 31 is located on the first surface of the dielectric plate 100, a first end of the first feed line 31 is connected to the first feeding port 50, and a second end of the first feed line 31 is connected to a first portion of the third dipole 30. The second feed line 32 is located on the second surface of the dielectric plate 100. A first end of the second feed line 32 is connected to the first surface of the dielectric plate 100 through a third through structure 33 and then connected to the first feeding port 50 on the first surface. The third through structure 33 includes one or more vias filled or plated with a conductive medium. A quantity of the vias included in the third through structure 33 is not specifically limited in this embodiment of this application. An example in FIG. 4 is described based on an example in which the third through structure 33 includes two vias. A second end of the second feed line 32 is connected to a second portion of the third dipole 30.

The fourth feeding structure includes a fourth dipole 40, a first feed line 41, and a second feed line 42. The first feed line 41 is located on the first surface of the dielectric plate 100, and a first end of the first feed line 41 is connected to the second surface of the dielectric plate 100 through a fourth through structure 43 and then connected to the second feeding port 60 on the second surface. The fourth through structure 43 includes one or more vias filled or plated with a conductive medium. A quantity of the vias included in the fourth through structure 43 is not specifically limited in this embodiment of this application. An example in FIG. 4 is described based on an example in which the fourth through structure 43 includes two vias. A second end of the first feed line 41 is connected to a first portion of the fourth dipole 40. The second feed line 42 is located on the second surface of the dielectric plate 100, a first end of the second feed line 42 is connected to the second feeding port 60 on the second surface of the dielectric plate 100, and a second end of the second feed line 42 is connected to a second portion of the fourth dipole 40.

That is, each feeding structure includes two parallel feed lines. The two feed lines are connected to a same output port located at a geometric center of the patch antenna array. Bodies of the two feed lines of same polarization are located on different surfaces of the dielectric plate, only near the geometric center of the array, and one of the feed lines is connected to the other side of the dielectric plate through a through structure, so that the two feed lines are changed from the different surfaces to a same surface. This design enables two polarized feeding ports to be designed on the different surfaces of the dielectric plate, preventing mutual position conflicts.

In some embodiments, the first end of the first feed line 11 of the first feeding structure and the first end of the first feed line 31 of the third feeding structure may be connected on the first surface, and a length of a connecting line between the two is $l_1$. The first feeding port is connected to the connecting line, equivalent to connecting the first feed line 11 of the first feeding structure and the first feed line 31 of the third feeding structure at the same time. The first end of the second feed line 22 of the second feeding structure and the first end of the second feed line 42 of the fourth feeding structure may be connected on the second surface, and a length of a connecting line may be 11. The first through structure 13 may be connected to the third through structure 33 on the first surface, and a length of a connecting line may be 11. The second through structure 23 may be connected to the fourth through structure 43 on the second surface, and a length of a connecting line may be 11.

In the above implementation, the first feed line 11 of the first feeding structure and the first feed line 21 of the second feeding structure feed the patch antenna 01, that is, excite the patch antenna 01. The second feed line 22 of the second feeding structure and the first feed line 31 of the third feeding structure feed the patch antenna 02. The second feed line 32 of the third feeding structure and the second feed line 42 of the fourth feeding structure feed the patch antenna 03. The first feed line 41 of the fourth feeding structure and the second feed line 12 of the first feeding structure feed the fourth patch antenna 04.

In the solution provided in this embodiment of this application, the four patch antennas are excited by dipole coupled feeding. Moreover, dipole in-phase feeding is realized. The four patch antennas can ensure consistent polarization according to a relative positional relationship. For single polarization, the excitation of the four patch antennas conventionally requires four ports, and correspondingly, the feeding circuit is a one-to-four structure. However, by use of the technical solution in this embodiment of this application, for single polarization, the excitation of the four patch antennas requires only two dipoles, and correspondingly, the feeding circuit is a one-to-two structure. That is, design complexity of the feeding circuit is reduced by dipole feeding. Moreover, the dipole is connected to two parallel feed lines, and the two parallel feed lines can be directly designed on the dielectric plate where the patch antennas are located, so that all feeding circuits and patch antennas can be realized on a same dielectric plate, which can effectively reduce complexity of the antenna structure and reduce the cost of the antenna structure.

A description is provided below with reference to specific implementations.

Figure 5:
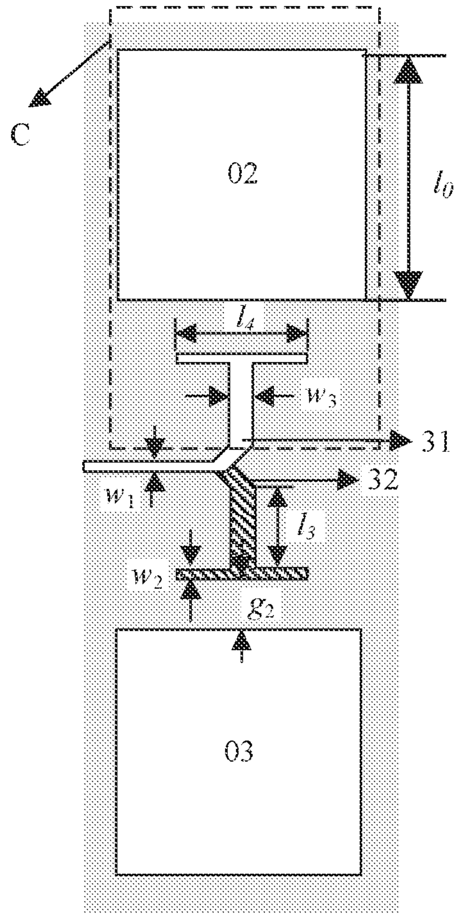
FIG. 5 is an enlarged view of Region B in FIG. 2 according to an embodiment of this application.
Figure 6A:
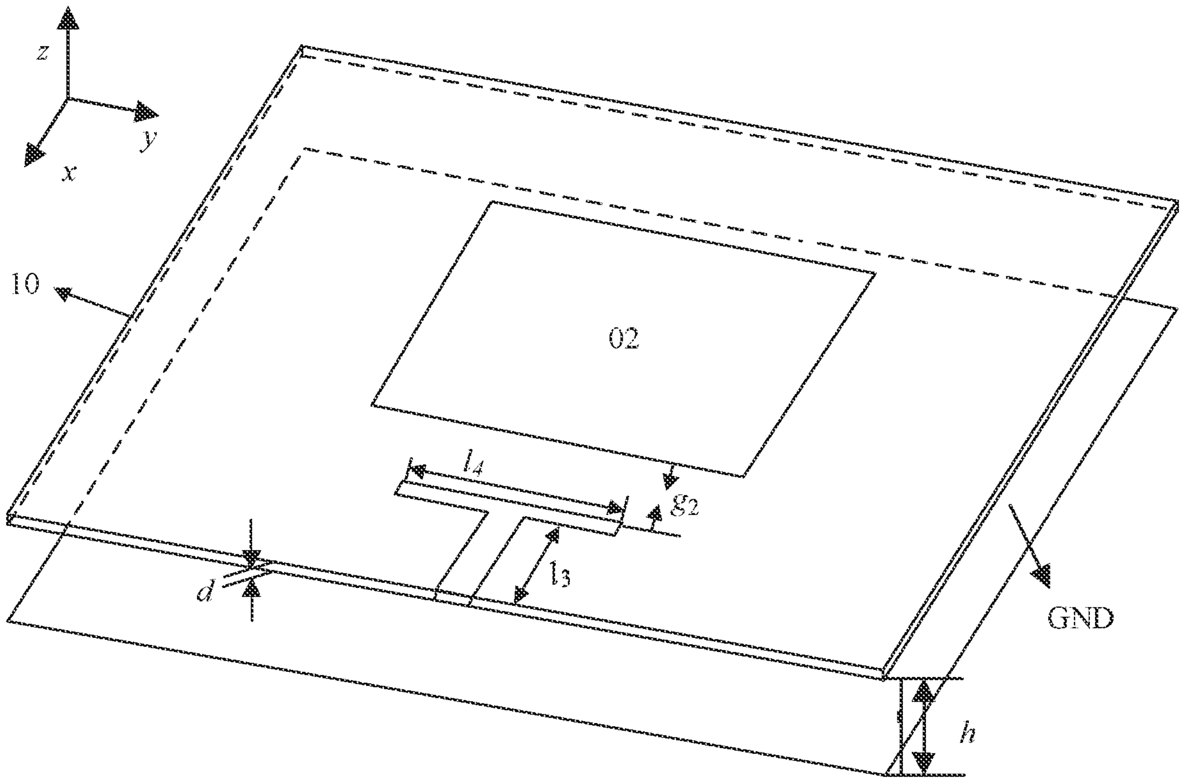
FIG. 6A is an enlarged view of Region C in FIG. 5 according to an embodiment of this application.
Figure 6B:
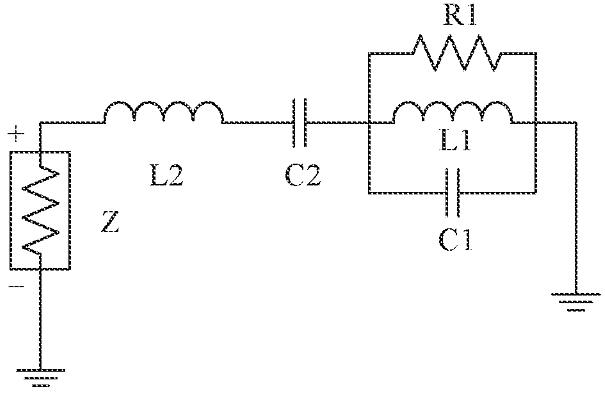
FIG. 6B is a first equivalent circuit diagram according to an embodiment of this application.

Refer to FIG. 5, FIG. 6A, and FIG. 6B together. FIG. 5 is an enlarged view of Region B in FIG. 2 according to an embodiment of this application. FIG. 6A is an enlarged view of Region C in FIG. 5 according to an embodiment of this application. FIG. 6B is a first equivalent circuit diagram corresponding to FIG. 6A according to an embodiment of this application.

The third dipole is selected for a specific description below. Specific implementations of other dipoles are similar, which are not described one by one in the embodiments of this application.

In the solutions provided in the embodiments of this application, the dipoles used are T-shaped dipoles. That is, the four patch antennas are all coupled and fed by the T-type dipoles. The T-type dipoles play a role of adjustment and matching.

Specifically, in FIG. 5, there is a certain distance, that is, a second preset distance, marked as g2, between a tail end of the T-shaped dipole and the patch antenna. Capacitance generated by g2 may be equivalent to that of a series capacitor C2 in FIG. 6B. Magnitude of the capacitance of the series capacitor C2 may be adjusted by adjusting a length of g2 according to an actual requirement. In actual adjustment, the shorter g2, the higher a capacitance value of the equivalent series capacitor C2. In addition, the capacitance of the series capacitor C2 may alternatively be adjusted by adjusting a T-shaped branch length 14. In actual adjustment, the longer 14, the higher the capacitance value of the equivalent series capacitor C2.

In FIG. 5, a dipole length of the T-shaped dipole is 13, inductance of the T-shaped dipole may be equivalent to that of a series inductor L2 in FIG. 6B, and magnitude of the inductance of the series inductor L2 may be adjusted by changing the dipole length 13. In actual adjustment, the longer 13, the greater the inductance of the series inductor L2.

That is, equivalent capacitance and inductance of the dipole may be adjusted by adjusting the distance g2, the T-shaped branch length 14, and the dipole length 13, thereby realizing impedance matching.

The patch antenna 02 or 03 in FIG. 5 may be equivalent to an equivalent resistor R1, an equivalent inductor L1, and an equivalent capacitor C1 that are connected in parallel in FIG. 6B.

In addition, the impedance between the two parallel feed lines can be adjusted by adjusting a width $w_1$ of the two parallel feed lines.

A principle of implementing impedance matching is specifically described below through examples.

A description is based on an example in which input impedance of an input terminal of the dipole is a first impedance value.

In this case, characteristic impedance between the first feed line and the second feed line included in each feeding structure is the first impedance value.

At the geometric center of the patch antenna array, the two feed lines are changed from different surfaces to a same surface by using a through structure. Two sets of parallel double lines of same polarization are connected in parallel, so that equivalent input impedance is half of the first impedance value. That is, the input impedance of the feeding port is half of the first impedance value.

FIG. 6B shows an equivalent circuit when the first portion of the dipole of the third feeding structure excites the patch antenna 02. In this case, input impedance Z in the figure is half of the first impedance value.

For example, referring to FIG. 2, the two parallel feed lines of the first feeding structure are connected in parallel to the two parallel feed lines of the third feeding structure. Since a characteristic impedance value between the parallel feed lines is the first impedance value, an equivalent impedance value after parallel connection is half of the first impedance value. Similarly, when the two parallel feed lines of the second feeding structure are connected in parallel to the two parallel feed lines of the fourth feeding structure, an equivalent impedance value is half of the first impedance value. In this case, for the first feeding port 50 on the first surface and the second feeding port 60 on the second surface, the input impedance of the ports is half of the first impedance value, thereby realizing impedance matching.

A specific size of the first impedance value is not limited in the embodiments of this application. For example, when the first impedance value is 100Ω, the characteristic impedance between two parallel feed lines is 100Ω, and the input impedance of the ports is 50Ω. That is, the input impedance Z of the feeding port in FIG. 6B is 50Ω.

Figure 7A:
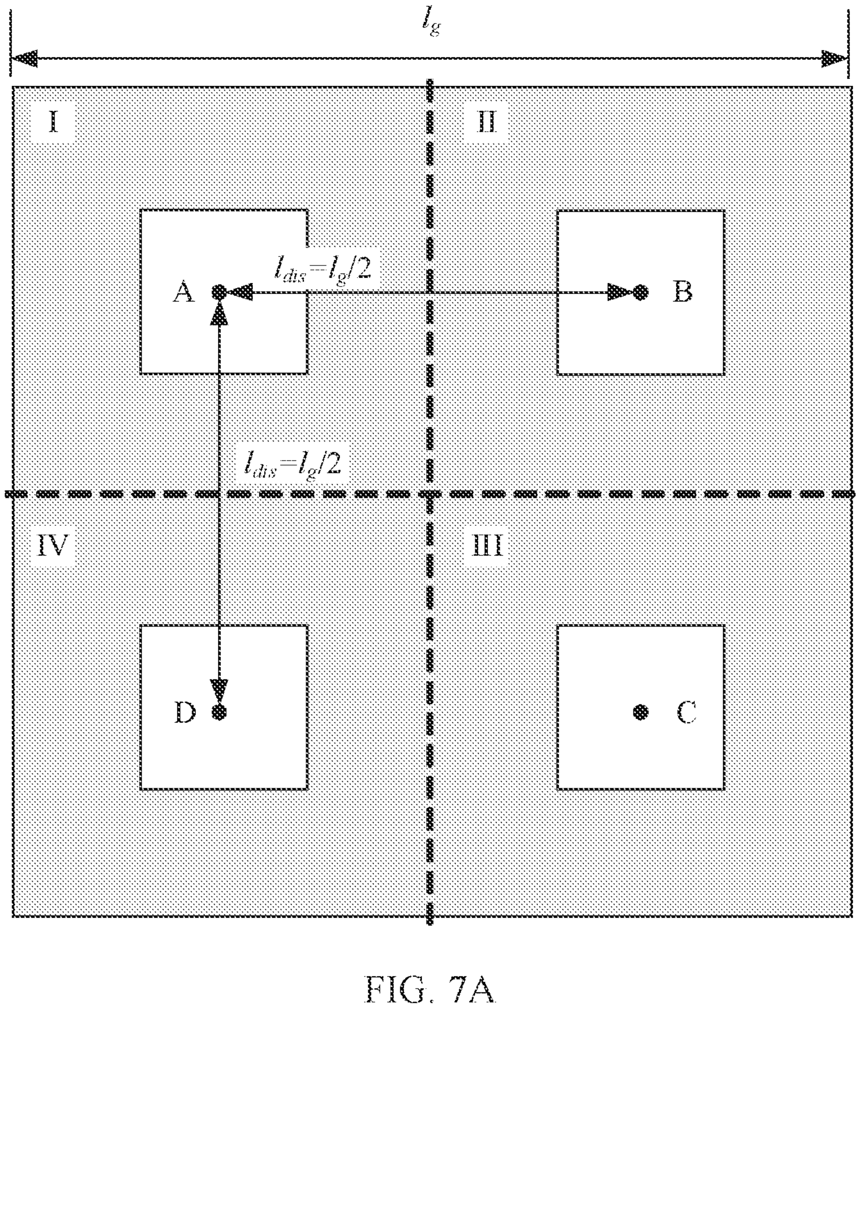
FIG. 7A is a schematic diagram of distribution of a patch antenna array according to an embodiment of this application.

Refer to FIG. 7A which is a schematic diagram of distribution of a patch antenna array according to an embodiment of this application.

For ease of description, in FIG. 7A, the antenna structure is divided into four identical square regions, namely Region I, Region II, Region III, and Region IV. Each patch antenna is located in a center of the square region. The first surface and the second surface of the dielectric plate are squares with equal areas, and a side length is a first preset length $l_g$. In this case, a length between geometric centers of two patch antennas in a same row or column is a second preset length $l_{dis}$. $l_{dis}$ is $l_g/2$.

When the patch antennas are arranged according to FIG. 7A, antenna gain may also be increased by increasing the side length $l_g$ of the antenna structure. However, since a quantity of cells is always 4, the gain that can be achieved is limited, so that aperture efficiency may decrease. In actual application, an operating wavelength of an antenna is represented by $\lambda_0$, and a specific proportional relationship between $l_g$ and $\lambda_0$ needs to be determined by comprehensively considering the antenna gain and the aperture efficiency.

Beneficial effects of the technical solutions of this application are analyzed and described below with reference to specific examples.

The operating wavelength of the antenna is represented by $\lambda_0$, and it is found through research and experiments that the antenna can obtain higher gain and aperture efficiency when $l_g$ ranges from $1.0\lambda_0$ to $1.4\lambda_0$.

In actual application, to minimize a size of the antenna structure, the value of $l_g$ may be a smaller value within a reasonable range. For example, $l_g$ may be selected as $1.12\lambda_0$. Under a condition that the above antenna size selection range is satisfied, the aperture efficiency is less affected by relative positions of the patch antennas. According to the 2×2 arrangement in FIG. 7A, the aperture efficiency is also higher even if $l_{dis}\approx l_g/2$.

Figure 7B:
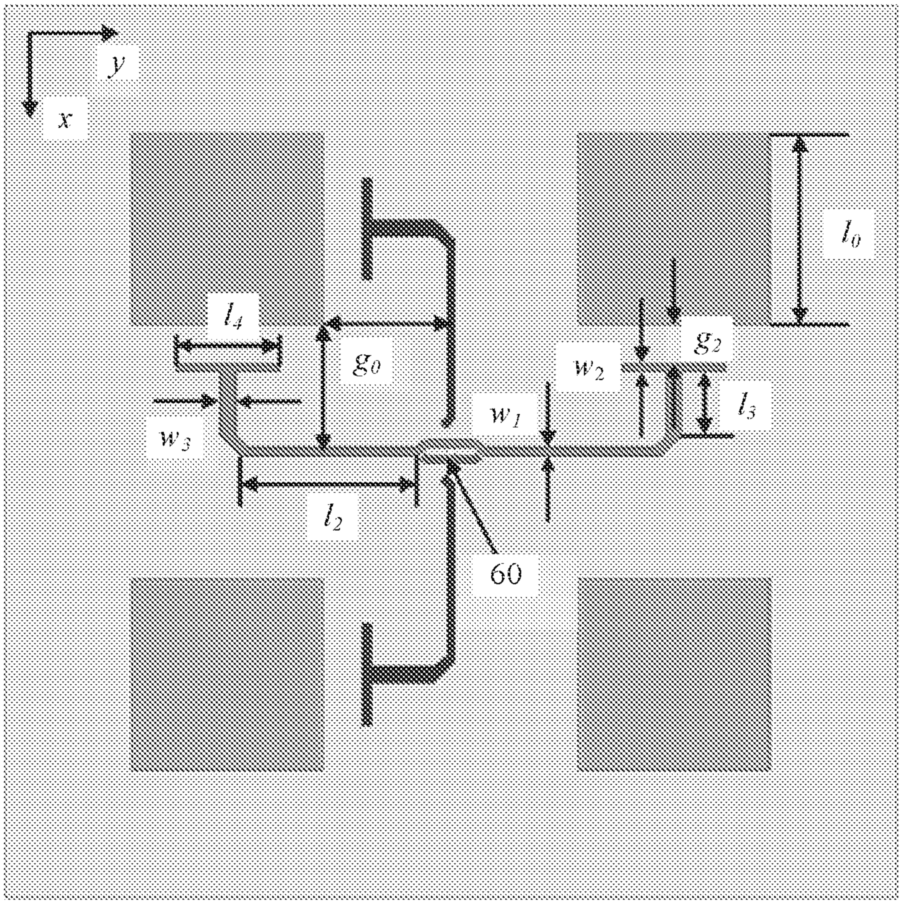
FIG. 7B is a schematic diagram of a front surface of an antenna structure according to an embodiment of this application.
Figure 7C:
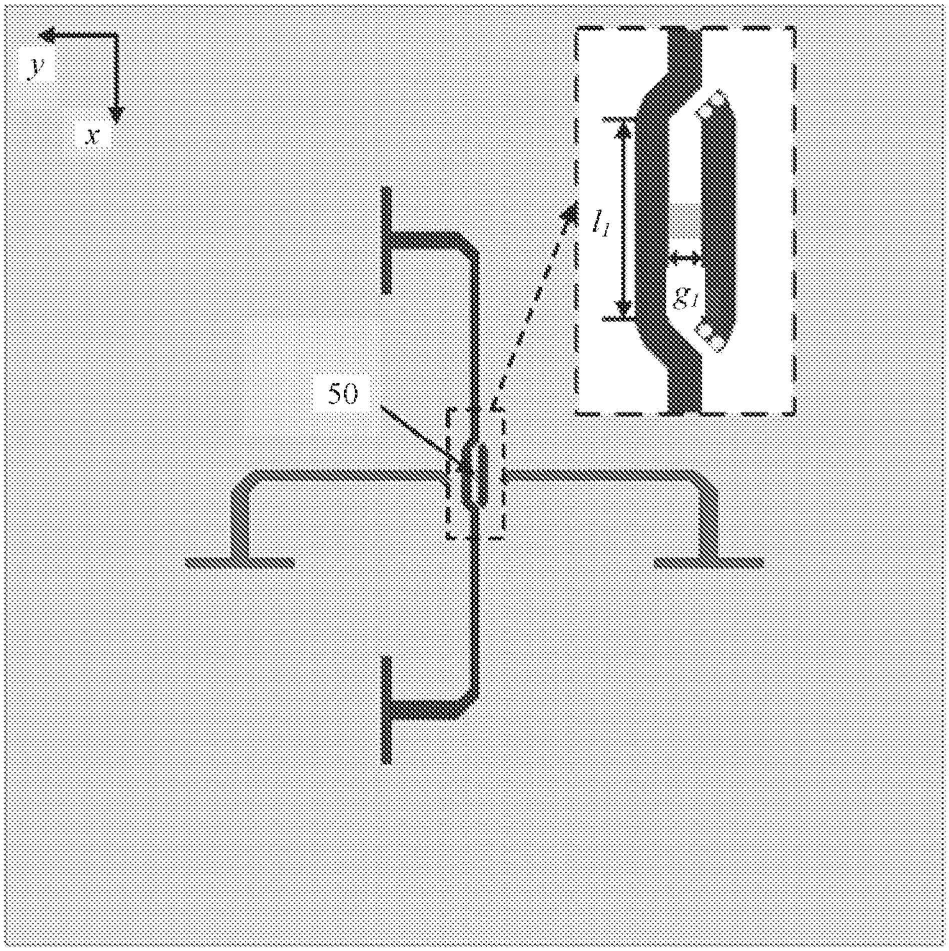
FIG. 7C is a schematic diagram of a rear surface of an antenna structure according to an embodiment of this application.

Refer to FIG. 7B and FIG. 7C together. FIG. 7B is a schematic diagram of a front surface of an antenna structure according to an embodiment of this application. FIG. 7C is a schematic diagram of a rear surface of an antenna structure according to an embodiment of this application.

For example, an operating wavelength of the antenna structure is $\lambda_0$=50 mm. Specification parameters of the front surface of the antenna structure (that is, a top surface) and the rear surface of the antenna structure (that is, a bot surface) are simulated and tested using specific parameter values in Table 1 below.

TABLE 1

Specific dimension of antenna structure (unit: mm)

| Parameter | $l_g$ | $l_0$ | $l_1$ | $l_2$ | $l_3$ | $l_4$ | d |
|---|---|---|---|---|---|---|---|
| Parameter value | 56 | 12 | 3 | 10.5 | 4 | 6.4 | 0.6 |
| Parameter | h | $w_1$ | $w_2$ | $w_3$ | $g_0$ | $g_1$ | $g_2$ |
| Parameter value | 7 | 0.5 | 0.5 | 1 | 8 | 0.5 | 2.5 |

Figure 8:
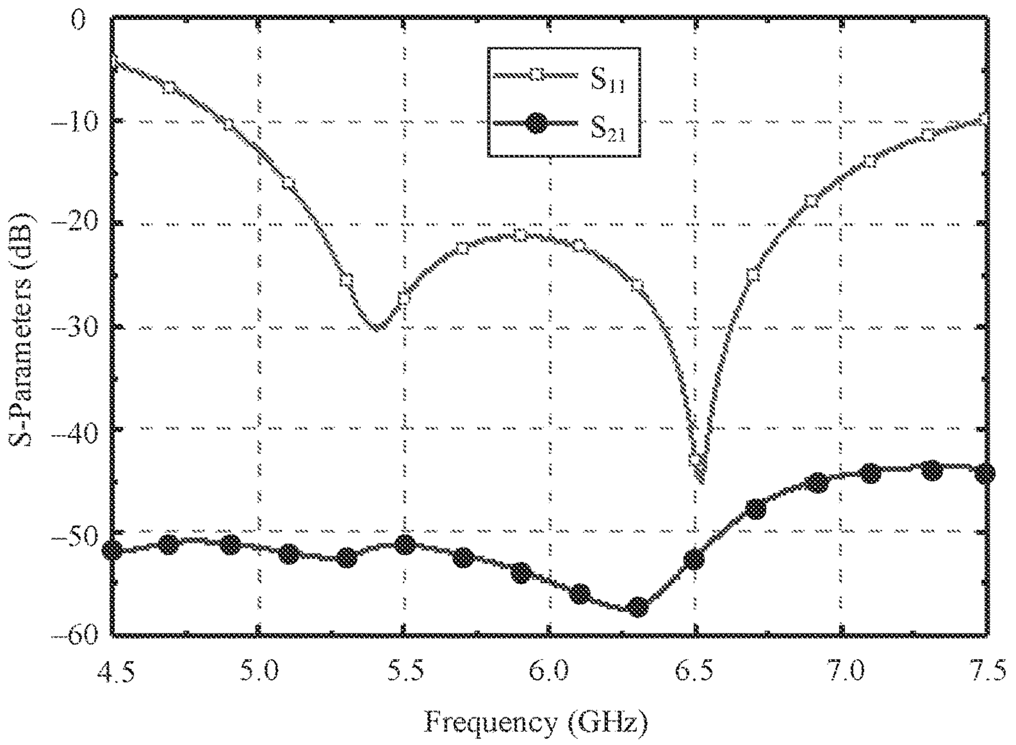
FIG. 8 is a schematic diagram of simulation of an S-parameter of an antenna structure according to an embodiment of this application.

Refer to FIG. 8 which is a schematic diagram of simulation of an S-parameter of an antenna structure according to an embodiment of this application.

The S-parameter (Scattering-Parameter) is a network parameter based on a relationship between an incident wave and a reflected wave, which is suitable for microwave circuit analysis. A circuit network is described by a reflected signal of a device port and a signal transmitted from the port to another port.

S11 denotes a reflection coefficient of Port 1 when Port 2 is matched.

S22 denotes a reflection coefficient of Port 2 when Port 1 is matched.

S12 denotes a reverse transfer coefficient from Port 2 to Port 1 when Port 1 is matched.

S21 denotes a forward transfer coefficient from Port 1 to Port 2 when Port 2 is matched.

For a symmetric network, S11=S22.

S11 may be used for indicating magnitude of gain, and S21 may be used for indicating a degree of isolation between two ports.

With the application of a Wi-Fi 6E standard, compared with a previous protocol, a new protocol has advantages of high bandwidth, high concurrency, low latency, and the like, and addition of a 6 GHz frequency band has effectively alleviated shortage of spectrum resources in 2.4 GHz and 5 GHz frequency bands. In terms of frequency spectrum, the 5 GHz (such as 5.15 GHz to 5.825 GHz) frequency band and the 6 GHz (such as 5.925 GHz to 7.125 GHz) frequency band are very close. If the antennas can cover the two frequency bands at the same time, a quantity of the antennas in the electronic device can be effectively reduced.

Referring to FIG. 8, it may be found that, when the reflection coefficient less than −10 dB is taken as a matching target, a matching bandwidth range of the antenna structure provided in this embodiment of this application ranges approximately from 4.90 GHz to 7.43 GHz, covering a 5 GHz frequency band and a 6 GHz frequency band of Wi-Fi 6 and Wi-Fi 6E. Due to symmetry, a curve of S22 is the same as that of S11. Therefore, the antenna structure provided in this application has high practicality, and the quantity of the antennas in the electronic device can be effectively reduced. The smaller the reflection coefficient, the more energy entering the antenna.

On the other hand, since polarization directions of the antenna structure are orthogonal, within a matching bandwidth, the degree of isolation between the first feeding port and the second feeding port is greater than 40 dB, that is, a degree of mutual interference between the two feeding ports of the antenna structure is lower, and performance of the antenna structure is better.

Figure 9:
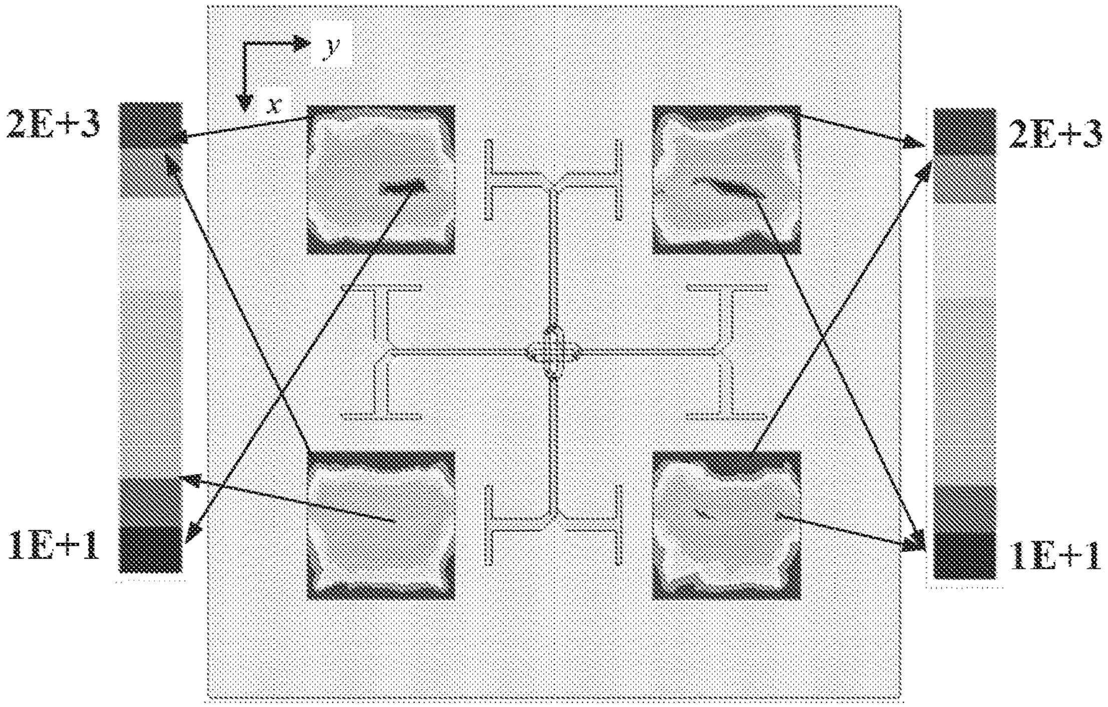
FIG. 9 is a schematic diagram of electric field amplitude distribution of an antenna structure according to an embodiment of this application.

Refer to FIG. 9 which is a schematic diagram of electric field amplitude distribution of an antenna structure according to an embodiment of this application.

As can be seen from FIG. 9, each patch antenna in the patch antenna array operates approximately in a $TM_{10}$ mode, a synthesized beam points to a direction +Z, and polarization directions are orthogonal.

$TM_{10}$ refers to an electromagnetic wave in a standard rectangular waveguide with electric field components but no magnetic field components along a direction of propagation. 1 indicates a half-wave change in an electromagnetic field in a direction of a wide side of the rectangular waveguide, and 0 indicates even distribution on a narrow side.

Figure 10:
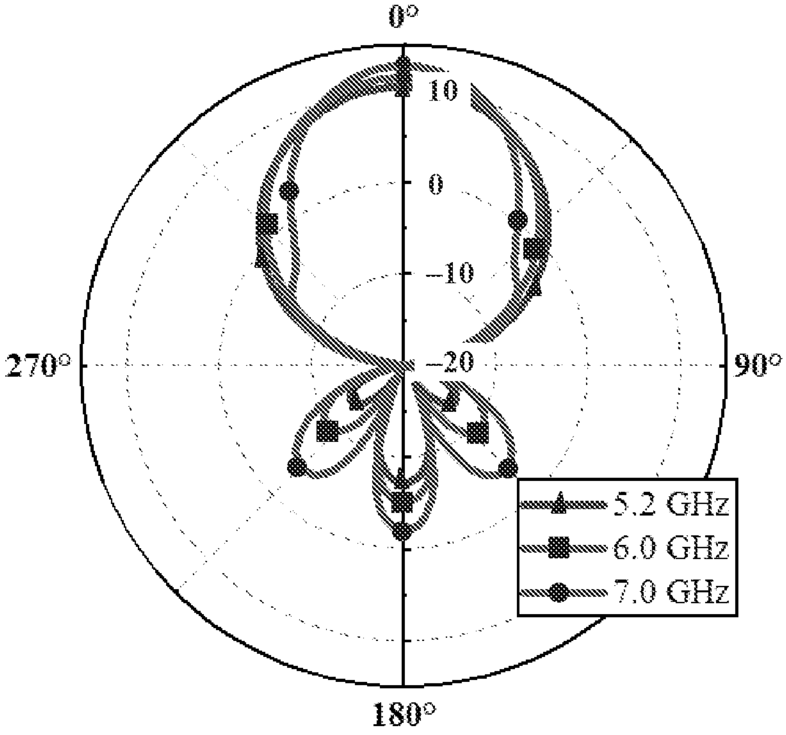
FIG. 10 is a radiation pattern of an xz plane according to an embodiment of this application.
Figure 11:
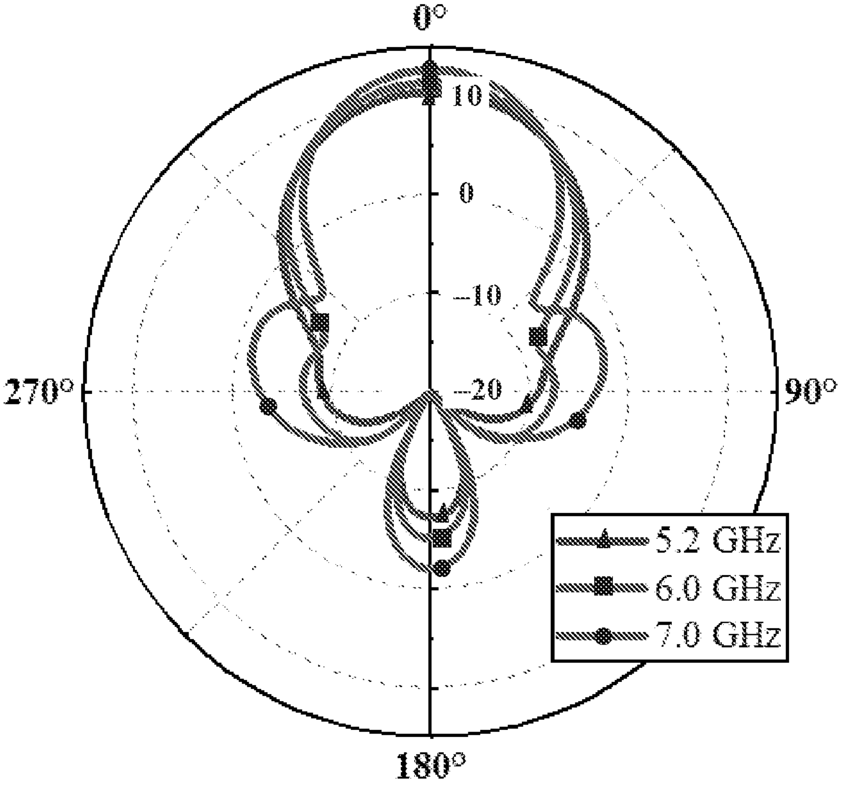
FIG. 11 is a radiation pattern of a yz plane according to an embodiment of this application.

Refer to FIG. 10 and FIG. 11 together. FIG. 10 is a radiation pattern of an xz plane according to an embodiment of this application. FIG. 11 is a radiation pattern of a yz plane according to an embodiment of this application.

To facilitate distinction of lines, in a radiation pattern, a curve when the operating frequency is 5.2 GHz is marked with a triangle, a curve when the operating frequency is 6.0 GHz is marked with a square, and a curve when the operating frequency is 7.0 GHz is marked with a circle. As can be seen from the figures, maximum gain within each matching bandwidth exceeds 10 dB, and the synthesized beam points to the direction +Z.

The description in the above embodiment is based on an example in which the patch antennas are squares. In actual application, the patch antennas may alternatively be in other shapes. A specific description is provided below with reference to the accompanying drawings.

Figure 12:
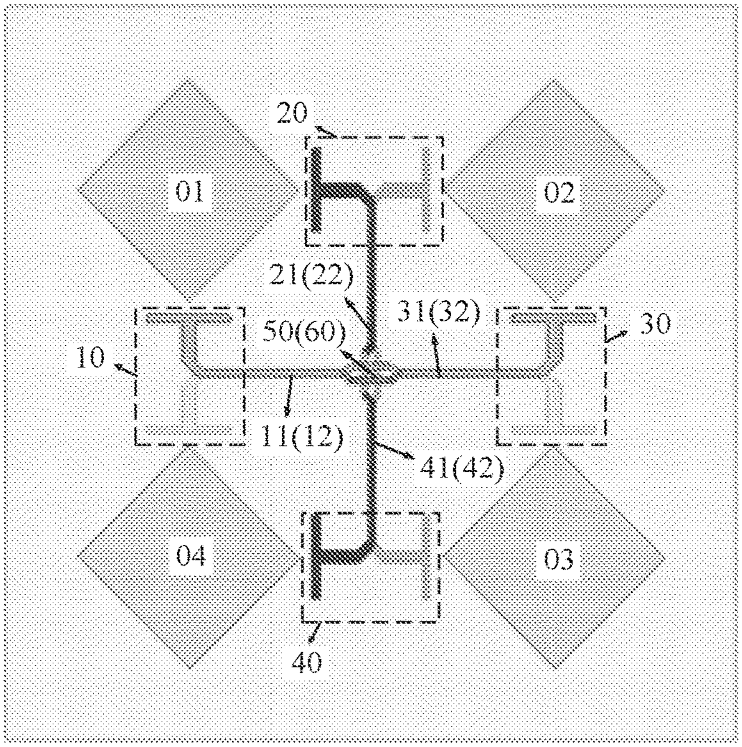
FIG. 12 is a schematic diagram of another antenna structure according to an embodiment of this application.

Refer to FIG. 12 which is a schematic diagram of another antenna structure according to an embodiment of this application.

The patch antennas 01 to 04 in the figure are rhombic patch antennas.

A first feeding structure is located between the patch antenna 01 and the patch antenna 04 in the first column, and the first feeding structure includes a first dipole 10, a first feed line 11, and a second feed line 12. The first feed line 11 and the second feed line 12 of the first feeding structure are connected to the first feeding port 50. Label 11(12) in the figure indicates that the first feed line 11 and the second feed line 12 are parallel and located on different surfaces of the dielectric plate, and overlap on a top view of the dielectric plate.

Label 50(60) in the figure indicates that the first feeding port 50 and the second feeding port 60 are located on different surfaces of the dielectric plate (that is, the first feeding port 50 is located on an upper surface of the dielectric plate and the second feeding port 60 is located on a lower surface of the dielectric plate), and overlap on the top view of the dielectric plate.

A second feeding structure is located between the patch antenna 01 and the patch antenna 02 in the first row, and the second feeding structure includes a second dipole 20, a first feed line 21, and a second feed line 22. The first feed line 21 and the second feed line 22 of the second feeding structure are connected to the second feeding port 60. Label 21(22) in the figure indicates that the first feed line 21 and the second feed line 22 are parallel and located on different surfaces of the dielectric plate, and overlap on a top view of the dielectric plate.

A third feeding structure is located between the patch antenna 02 and the patch antenna 03 in the second column, and the third feeding structure includes a third dipole 30, a first feed line 31, and a second feed line 32. The first feed line 31 and the second feed line 32 of the third feeding structure are connected to the first feeding port 50. Label 31(32) in the figure indicates that the first feed line 31 and the second feed line 32 are parallel and located on different surfaces of the dielectric plate, and overlap on a top view of the dielectric plate.

A fourth feeding structure is located between the patch antenna 03 and the patch antenna 04 in the second row, and the fourth feeding structure includes a fourth dipole 40, a first feed line 41, and a second feed line 42. The first feed line 41 and the second feed line 42 of the fourth feeding structure are connected to the second feeding port 60. Label 41(42) in the figure indicates that the first feed line 41 and the second feed line 42 are parallel and located on different surfaces of the dielectric plate, and overlap on a top view of the dielectric plate.

Implementations of the above feeding structures are similar to those in the descriptions in FIG. 3 to FIG. 6B above. Details are not described herein again.

Figure 13:
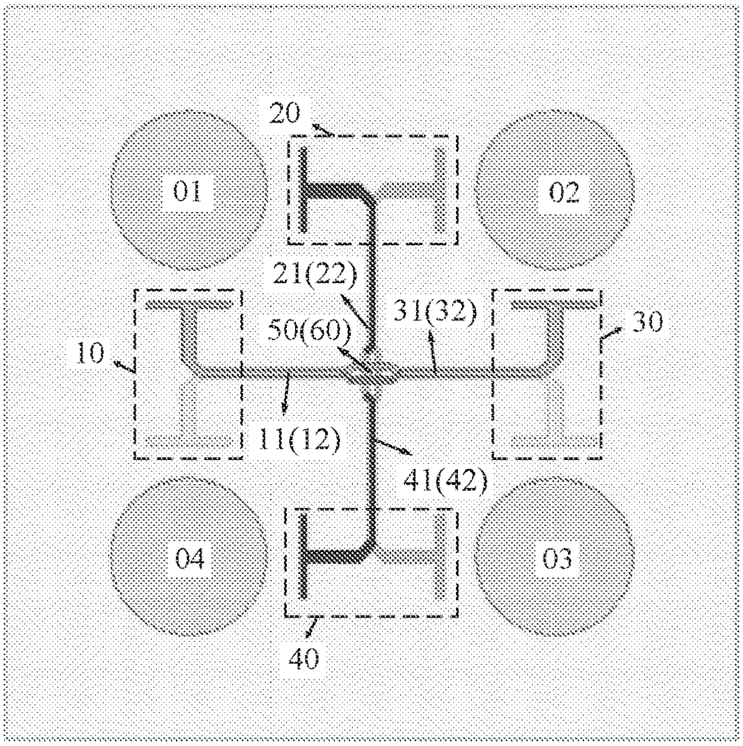
FIG. 13 is a schematic diagram of yet another antenna structure according to an embodiment of this application.

Refer to FIG. 13 which is a schematic diagram of yet another antenna structure according to an embodiment of this application.

The patch antennas 01 to 04 in the figure are circular patch antennas.

A first feeding structure is located between the patch antenna 01 and the patch antenna 04 in the first column, and the first feeding structure includes a first dipole 10, a first feed line 11, and a second feed line 12. The first feed line 11 and the second feed line 12 of the first feeding structure are connected to the first feeding port 50. Label 11(12) in the figure indicates that the first feed line 11 and the second feed line 12 are parallel and located on different surfaces of the dielectric plate, and overlap on a top view of the dielectric plate.

Label 50(60) in the figure indicates that the first feeding port 50 and the second feeding port 60 are located on different surfaces of the dielectric plate (that is, the first feeding port 50 is located on an upper surface of the dielectric plate and the second feeding port 60 is located on a lower surface of the dielectric plate), and overlap on the top view of the dielectric plate.

A second feeding structure is located between the patch antenna 01 and the patch antenna 02 in the first row, and the second feeding structure includes a second dipole 20, a first feed line 21, and a second feed line 22. The first feed line 21 and the second feed line 22 of the second feeding structure are connected to the second feeding port 60. Label 21(22) in the figure indicates that the first feed line 21 and the second feed line 22 are parallel and located on different surfaces of the dielectric plate, and overlap on a top view of the dielectric plate.

A third feeding structure is located between the patch antenna 02 and the patch antenna 03 in the second column, and the third feeding structure includes a third dipole 30, a first feed line 31, and a second feed line 32. The first feed line 31 and the second feed line 32 of the third feeding structure are connected to the first feeding port 50. Label 31(32) in the figure indicates that the first feed line 31 and the second feed line 32 are parallel and located on different surfaces of the dielectric plate, and overlap on a top view of the dielectric plate.

A fourth feeding structure is located between the patch antenna 03 and the patch antenna 04 in the second row, and the fourth feeding structure includes a fourth dipole 40, a first feed line 41, and a second feed line 42. The first feed line 41 and the second feed line 42 of the fourth feeding structure are connected to the second feeding port 60. Label 41(42) in the figure indicates that the first feed line 41 and the second feed line 42 are parallel and located on different surfaces of the dielectric plate, and overlap on a top view of the dielectric plate.

Implementations of the feeding structures are similar to those in the descriptions in FIG. 3 to FIG. 6B above. Details are not described herein again.

In addition, the dipole may alternatively be a dipole in another shape, which is specifically described below with reference to the accompanying drawings.

Figure 14:
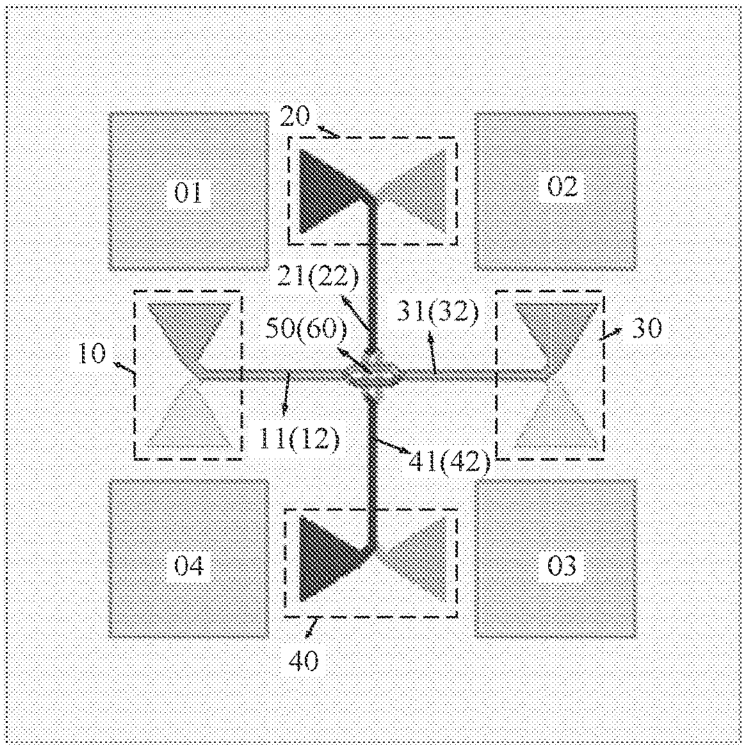
FIG. 14 is a schematic diagram of still another antenna structure according to an embodiment of this application.

Refer to FIG. 14 which is a schematic diagram of still another antenna structure according to an embodiment of this application.

FIG. 14 is based on an example in which the patch antennas 01 to 04 are square patch antennas.

A first feeding structure is located between the patch antenna 01 and the patch antenna 04 in the first column, and the first feeding structure includes a first dipole 10, a first feed line 11, and a second feed line 12. The first feed line 11 and the second feed line 12 of the first feeding structure are connected to the first feeding port 50. Label 11(12) in the figure indicates that the first feed line 11 and the second feed line 12 are parallel and located on different surfaces of the dielectric plate, and overlap on a top view of the dielectric plate.

Label 50(60) in the figure indicates that the first feeding port 50 and the second feeding port 60 are located on different surfaces of the dielectric plate (that is, the first feeding port 50 is located on an upper surface of the dielectric plate and the second feeding port 60 is located on a lower surface of the dielectric plate), and overlap on the top view of the dielectric plate.

A second feeding structure is located between the patch antenna 01 and the patch antenna 02 in the first row, and the second feeding structure includes a second dipole 20, a first feed line 21, and a second feed line 22. The first feed line 21 and the second feed line 22 of the second feeding structure are connected to the second feeding port 60. Label 21(22) in the figure indicates that the first feed line 21 and the second feed line 22 are parallel and located on different surfaces of the dielectric plate, and overlap on a top view of the dielectric plate.

A third feeding structure is located between the patch antenna 02 and the patch antenna 03 in the second column, and the third feeding structure includes a third dipole 30, a first feed line 31, and a second feed line 32. The first feed line 31 and the second feed line 32 of the third feeding structure are connected to the first feeding port 50. Label 31(32) in the figure indicates that the first feed line 31 and the second feed line 32 are parallel and located on different surfaces of the dielectric plate, and overlap on a top view of the dielectric plate.

A fourth feeding structure is located between the patch antenna 03 and the patch antenna 04 in the second row, and the fourth feeding structure includes a fourth dipole 40, a first feed line 41, and a second feed line 42. The first feed line 41 and the second feed line 42 of the fourth feeding structure are connected to the second feeding port 60. Label 41(42) in the figure indicates that the first feed line 41 and the second feed line 42 are parallel and located on different surfaces of the dielectric plate, and overlap on a top view of the dielectric plate.

The first dipole 10, the second dipole 20, the third dipole 30, and the fourth dipole 40 in the figure are bow-tie dipoles. That is, branches of the first portion and the second portion of each dipole are triangular branches.

It may be understood that, when the bow-tie dipoles are used, the patch antennas may alternatively be the rhombic patch antennas shown in FIG. 12 or the circular patch antennas shown in FIG. 13.

Figure 15:
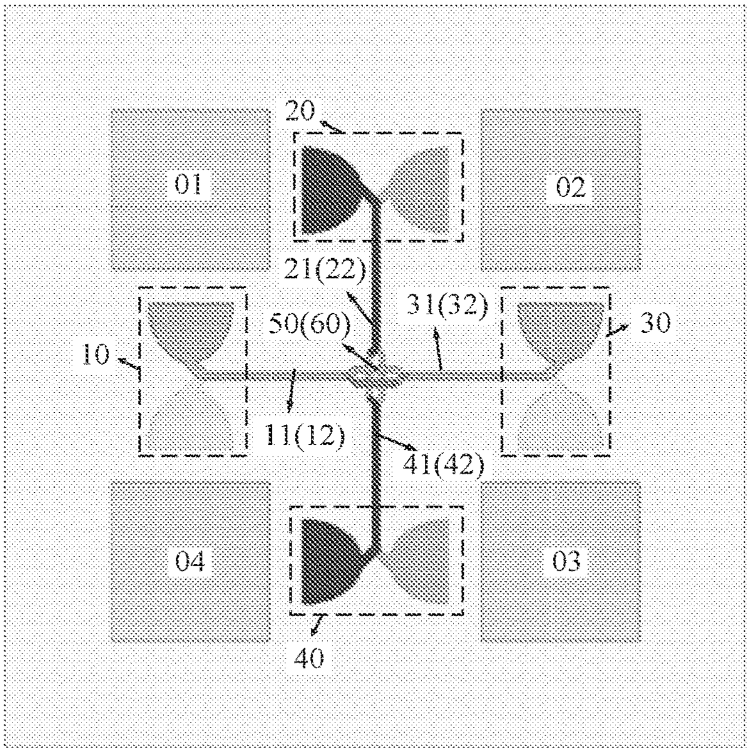
FIG. 15 is a schematic diagram of another antenna structure according to an embodiment of this application.

Refer to FIG. 15 which is a schematic diagram of another antenna structure according to an embodiment of this application.

FIG. 15 is different from FIG. 14 in that the first dipole 10, the second dipole 20, the third dipole 30, and the fourth dipole 40 in FIG. 15 are circular dipoles. That is, the branches of the first portion and the second portion of each dipole are semicircular branches. It may be understood that, when the bow-tie dipoles are used, the patch antennas may alternatively be the rhombic patch antennas shown in FIG. 12 or the circular patch antennas shown in FIG. 13.

In some embodiments, when the above antenna structure is applied to an electronic device, a first feeding interface and a second feeding interface are connected to a radio-frequency circuit of the electronic device through a cable.

To sum up, in the solution provided in this embodiment of this application, T-shaped dipoles are used for in-phase feeding, so that the four patch antennas can ensure consistent polarization and orthogonal polarization of each patch antenna. For single polarization, the excitation of the four patch antennas conventionally requires four ports, and correspondingly, the feeding circuit is a one-to-four structure. However, by use of the technical solution in this embodiment of this application, for single polarization, the excitation of the four patch antennas requires only two dipoles, and correspondingly, the feeding circuit is a one-to-two structure. That is, design complexity of the feeding circuit is reduced by dipole feeding. Moreover, the dipole is connected to two parallel feed lines, and the two parallel feed lines can be directly designed on the dielectric plate where the patch antennas are located, so that all feeding circuits and patch antennas can be realized on a same dielectric plate, which reduces complexity of the feeding circuit, that is, reduces complexity of the antenna structure, and reduces the cost of the antenna structure. In addition, the antenna structure is directional, has high directional gain, has a high degree of isolation between the two feeding ports, and can also cover a wide frequency band range, for example, both the 5 GHz frequency band and the 6 GHz frequency band of Wi-Fi 6 and Wi-Fi 6E. Therefore, practicability is higher.

It may be understood that, in the above description, it is merely an example that the antenna structure covers the 5 GHz frequency band and the 6 GHz frequency band of Wi-Fi 6 and Wi-Fi 6E. In actual application, the antenna structure may alternatively be designed for use in other frequency bands. In some embodiments, a thickness of the dielectric plate of the antenna structure may be determined according to the operating frequency band, and other design parameters of the antenna structure may be adjusted accordingly.

In actual application, when the thickness d of the dielectric plate 100 is relatively low, the feed lines may not be implemented as the parallel double lines described in the above embodiments, but adopt slot-line feeding. In the implementation, the dipole and the feed lines included in a same feeding structure are located on a same surface of the dielectric plate and are connected to a same feeding interface, which is specifically described below with reference to the accompanying drawings.

Figure 16:
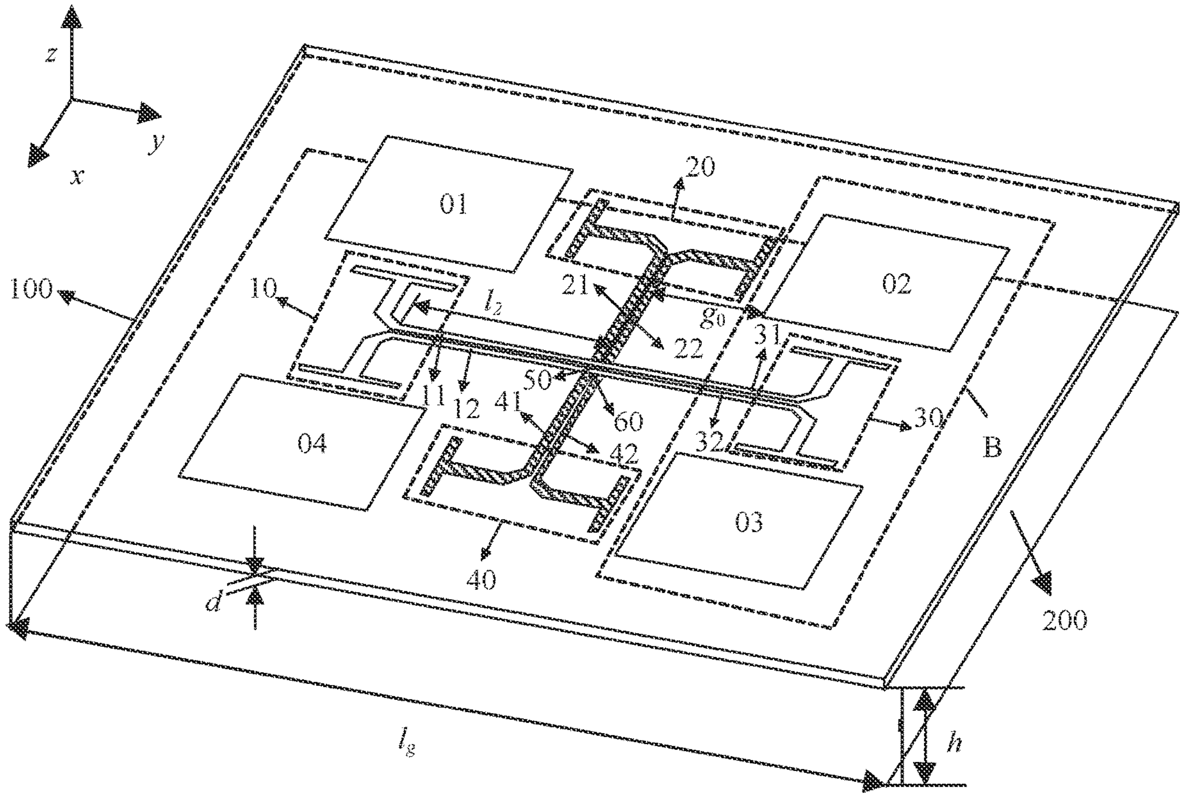
FIG. 16 is a schematic diagram of still another antenna structure according to an embodiment of this application.

Refer to FIG. 16 which is a schematic diagram of still another antenna structure according to an embodiment of this application.

The antenna structure shown in FIG. 2 includes a dielectric plate 100, a patch antenna array, a first feeding structure, a second feeding structure, a third feeding structure, a fourth feeding structure, a first feeding port 50, and a second feeding port 60.

The patch antenna array is located on a first surface of the dielectric plate 100.

The first feeding structure and the third feeding structure are located on the first surface of the dielectric plate 100, and the second feeding structure and the fourth feeding structure are located on a second surface of the dielectric plate 100.

The first feeding structure includes a first dipole 10, a first slot line 11, and a second slot line 12. A first end of the first slot line 11 is connected to the first feeding port 50, and a second end of the first slot line 11 is connected to a first portion of the first dipole 10. A first end of the second slot line 12 is connected to the first feeding port 50, and a second end of the second slot line 12 is connected to a second portion of the first dipole 10.

The second feeding structure includes a second dipole 20, a first slot line 21, and a second slot line 22. A first end of the first slot line 21 is connected to the second feeding port 60, and a second end of the first slot line 21 is connected to a first portion of the second dipole 20. A first end of the second slot line 22 is connected to the second feeding port 60, and a second end of the second slot line 22 is connected to a second portion of the second dipole 20.

The third feeding structure includes a third dipole 30, a first slot line 31, and a second slot line 32. A first end of the first slot line 31 is connected to the first feeding port 50, and a second end of the first slot line 31 is connected to a first portion of the third dipole 30. A first end of the second slot line 32 is connected to the first feeding port 50, and a second end of the second slot line 32 is connected to a second portion of the third dipole 30.

The fourth feeding structure includes a fourth dipole 10, a first slot line 41, and a second slot line 42. A first end of the first slot line 41 is connected to the second feeding port 60, and a second end of the first slot line 41 is connected to a first portion of the fourth dipole 40. A first end of the second slot line 42 is connected to the second feeding port 60, and a second end of the second slot line 42 is connected to a second portion of the fourth dipole 40.

In some embodiments, the first end of the first slot line 11 of the first feeding structure and the first end of the first slot line 31 of the third feeding structure may be connected on the first surface. The first end of the second slot line 12 of the first feeding structure and the first end of the second slot line 32 of the third feeding structure may be connected on the first surface. The first end of the first slot line 21 of the second feeding structure and the first end of the first slot line 41 of the fourth feeding structure may be connected on the second surface. The first end of the second slot line 22 of the second feeding structure and the first end of the second slot line 42 of the fourth feeding structure may be connected on the second surface.

In the above implementation, the first slot line 11 of the first feeding structure and the first slot line 21 of the second feeding structure feed the patch antenna 01, that is, excite the patch antenna 01. The second slot line 22 of the second feeding structure and the first slot line 31 of the third feeding structure feed the patch antenna 02. The second slot line 32 of the third feeding structure and the second slot line 42 of the fourth feeding structure feed the patch antenna 03. The first slot line 41 of the fourth feeding structure and the second slot line 12 of the first feeding structure feed the fourth patch antenna 04.

The above slot lines are slot lines. When the implementation of slot-line feeding is adopted, the patch antennas may alternatively be the rhombic patch antennas or circular patch antennas shown in the above embodiments, and the dipoles may alternatively be the bow-tie dipoles or circular dipoles shown in the above embodiments.

In the solution provided in this embodiment of this application, the manner of slot-line feeding is adopted. Compared with the conventional feeding manner, only two dipoles are needed to excite the four patch antennas for single polarization, which reduces the design complexity of the feeding circuit. The two parallel slot lines can be directly designed on the dielectric plate where the patch antennas are located, so that all feeding circuits and patch antennas can be realized on a same dielectric plate, which can effectively reduce complexity of the antenna structure and reduce the cost of the antenna structure.

Based on the antenna structure provided in the above embodiments, an embodiment of this application further provides an electronic device to which the antenna structure is applied. A specific description is provided below with reference to the accompanying drawings.

Figure 17:
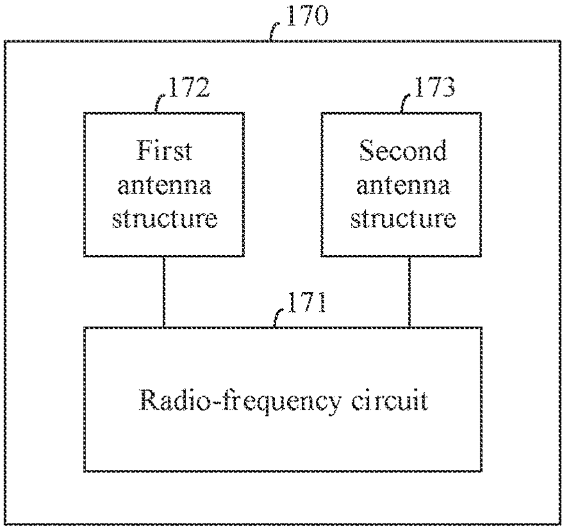
FIG. 17 is a schematic diagram of an electronic device according to an embodiment of this application.

Refer to FIG. 17 which is a schematic diagram of an electronic device according to an embodiment of this application.

An electronic device 170 includes one or more antenna structures according to the embodiments of this application, and further includes a radio-frequency circuit 171. In FIG. 17, a description is based on an example in which the electronic device 170 includes two antenna structures, namely a first antenna structure 172 and a second antenna structure 173.

In the figure, the first antenna structure 172 and the second antenna structure 173 are connected to a same radio-frequency circuit 171.

The radio-frequency circuit 171 is configured to perform processing such as filtering or amplification on electromagnetic waves received by the first antenna structure 172 and the second antenna structure 173, transmit the processed electromagnetic waves to a modem processor for demodulation, further amplify a signal modulated by the modem processor, and convert the signal into an electromagnetic wave for radiation through the first antenna structure 172 and the second antenna structure 173. In some embodiments, the modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal.

The frequency band ranges covered by the antenna structures may be the same or different, which is not specifically limited in this embodiment of this application. For example, the frequency band range that can be covered by the first antenna structure 172 is a first frequency band range, the frequency band range that can be covered by the second antenna structure 173 is a second frequency band range, and the first frequency band range and the second frequency band range may be the same or different. When the first frequency band range and the second frequency band range are different, there may be partially overlapping frequency bands between the first frequency band range and the second frequency band range, or the first frequency range and the second frequency range do not overlap at all.

A specific description about the antenna structure may be obtained with reference to the above embodiments. Details are not described herein again.

Figure 18:
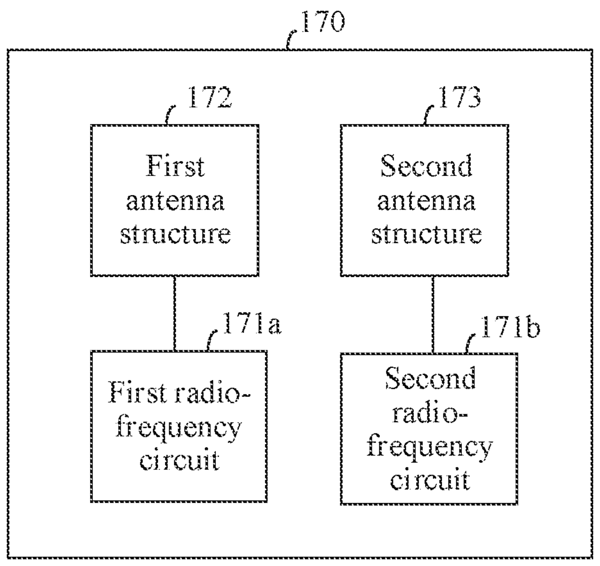
FIG. 18 is a schematic diagram of another electronic device according to an embodiment of this application.

Refer to FIG. 18 which is a schematic diagram of another electronic device according to an embodiment of this application.

The electronic device shown in FIG. 18 is different from the electronic device in FIG. 17 in that the electronic device includes two radio-frequency circuits, namely a first radio-frequency circuit 171*a* and a second radio-frequency circuit 171*b*.

The first radio-frequency circuit 171*a* is connected to the first antenna structure 172, and the second radio-frequency circuit 171*b* is connected to the second antenna structure 173.

In this case, the frequency band ranges that can be covered by the first antenna structure 172 and the second antenna structure 173 are different.

The first radio-frequency circuit 171*a* and the second radio-frequency circuit 171*b* above may be disposed on different circuit boards or disposed on a same circuit board, which is not specifically limited in this embodiment of this application.

Figure 19:
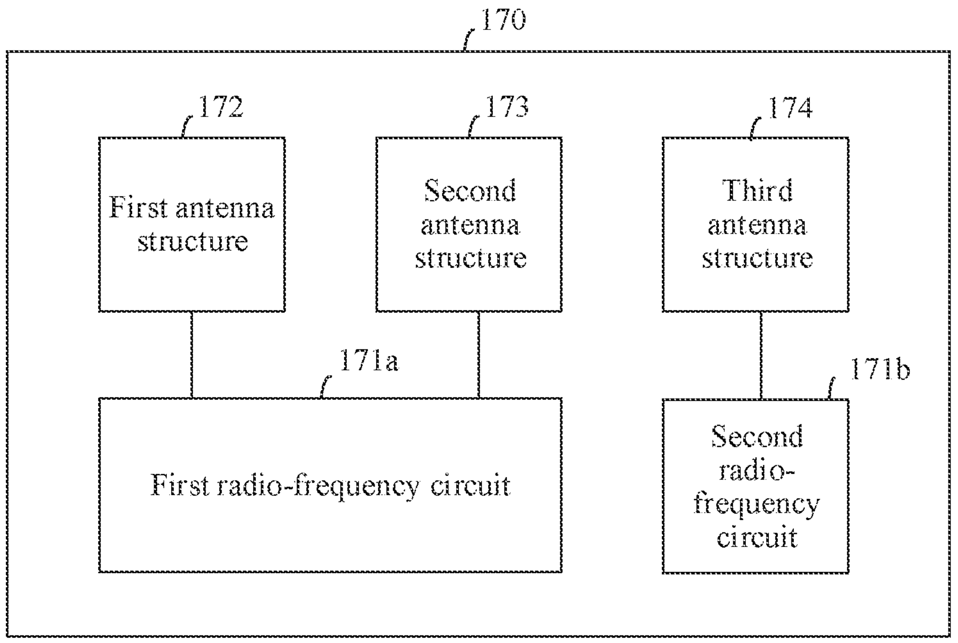
FIG. 19 is a schematic diagram of yet another electronic device according to an embodiment of this application.

Refer to FIG. 19 which is a schematic diagram of yet another electronic device according to an embodiment of this application.

The electronic device includes a first antenna structure 172, a second antenna structure 173, a third antenna structure 174, a first radio-frequency circuit 171*a*, and a second radio-frequency circuit 171*b*.

The first radio-frequency circuit 171*a* is connected to the first antenna structure 172 and the second antenna structure 173.

The second radio-frequency circuit 171*b* is connected to the third antenna structure 174.

The first antenna structure 172 and the second antenna structure 173 adopt the technical solution provided in this embodiment of this application to implement functions of a directional antenna.

The third antenna structure 174 is configured to implement functions of an omnidirectional antenna. A specific implementation of the third antenna structure 174 is not limited in this embodiment of this application.

A frequency band range that can be covered by the third antenna structure 174 may be the same as or different from that can be covered by the first antenna structure 172. The frequency band range that can be covered by the third antenna structure 174 may be the same as or different from that can be covered by the second antenna structure 173.

The type of the electronic device is not specifically limited in this application. The electronic device may be a mobile phone, a notebook computer, a wearable device (such as a smart watch), a tablet computer, an AR device, a VR device, a router device, an in-vehicle device, or the like. In a typical application scenario, the electronic device is a router.

When the antenna structure provided in this embodiment of this application is used, a frequency band range that can be covered by the antenna structure can be changed by changing the first preset distance between the dielectric plate and the metal bottom plate of the antenna structure.

To sum up, the antenna structure provided in the above embodiments is applied to the electronic device. In the antenna structure, the four patch antennas are excited by dipole coupled feeding. Moreover, dipole in-phase feeding is realized. The four patch antennas can ensure consistent polarization according to a relative positional relationship. For single polarization, the excitation of the four patch antennas conventionally requires four ports, and correspondingly, the feeding circuit is a one-to-four structure. However, by use of the technical solution of this application, for single polarization, the excitation of the four patch antennas requires only two feeding structures, and correspondingly, the feeding circuit is a one-to-two structure. Therefore, design complexity of the feeding circuit is reduced. Moreover, the dipole is connected to two parallel feed lines, and the two parallel feed lines can be directly designed on the dielectric plate where the patch antennas are located, so that all feeding circuits and patch antennas can be realized on a same dielectric plate, which can effectively reduce complexity of the antenna structure and reduce the cost of the antenna structure. That is, the cost of the electronic device is reduced.

In addition, the antenna structure is directional, has high directional gain, has a high degree of isolation between the two feeding ports, and can also cover a wide frequency band range, for example, both a 5 GHz frequency band and a 6 GHz frequency band of Wi-Fi 6 and Wi-Fi 6E. Therefore, practicability is higher, and a quantity of antennas disposed on the electronic device can be reduced, to further reduce the cost of hardware of the electronic device.

Based on the antenna structure and the electronic device provided in the above embodiments, an embodiment of this application further provides a wireless network system, which is specifically described below with reference to the accompanying drawings.

Figure 20:
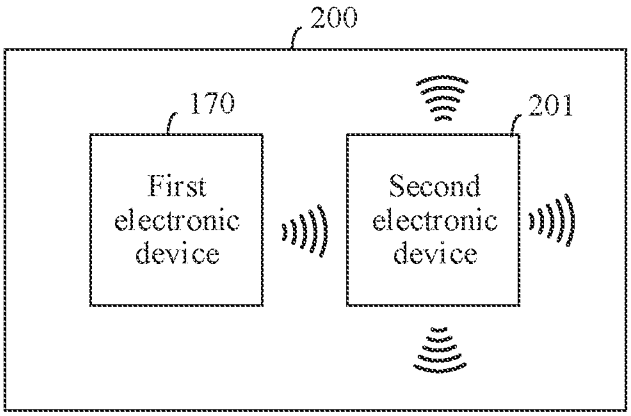
FIG. 20 is a schematic diagram of a wireless network system according to an embodiment of this application.

Refer to FIG. 20 which is a schematic diagram of a wireless network system according to an embodiment of this application.

The wireless network system 300 includes a plurality of electronic devices. The antenna structure provided in the embodiments of this application is applied to at least one of the plurality of electronic devices.

The wireless network system 300 illustrated includes a first electronic device 170 and a second electronic device 301.

The first electronic device 170 includes one or more antenna structures according to the embodiments of this application, and further includes a radio-frequency circuit. The first electronic device 170 has higher directional gain and is configured to perform data transmission with the second electronic device 301 along a specific direction. In a typical implementation, the first electronic device 170 is a directional router.

Specific implementations of the first electronic device 170 and the antenna structure included in the first electronic device 170 may be obtained with reference to the related descriptions in the above embodiments. Details are not described herein again.

An omnidirectional antenna is applied to the second electronic device 301. In a typical implementation manner, the second electronic device 201 is an omnidirectional router.

It may be understood that the above wireless network system 300 is merely an exemplary description, and in actual application, when the wireless network system 300 is built according to a specific environmental condition, quantities of the first electronic device 170 and the second electronic device 301 may be further increased, and the second electronic device 301 may also perform data transmission with a plurality of first electronic devices 170 at the same time.

To sum up, the antenna structure provided in this application is applied to the electronic devices in the wireless network system. On the one hand, the cost of the electronic devices is saved. On the other hand, gain of the electronic devices in a specific direction is increased. Therefore, signal quality and network stability of the wireless network system are improved.

It should be understood that, in this application, "at least one" means one or more, and "a plurality of" means two or more. "And/or" describes an association relationship for describing associated objects and represents that three relationships may exist. For example, "A and/or B" may represent the following three cases: only A exists, only B exists, and both A and B exist, where A and B may be singular or plural. The character "I" generally indicates an "or" relationship between the associated objects. "At least one of the following items" or a similar expression means any combination of these items, including a single item or any combination of a plurality of items. For example, at least one of a, b, and c may represent: a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, it should be appreciated by a person of ordinary skill in the art that, modifications may still be made to the technical solutions described in the foregoing embodiments, or equivalent replacements may be made to the part of the technical features; and these modifications or replacements will not cause the essence of corresponding technical solutions to depart from the spirit and scope of the technical solutions in the embodiments of this application.

What is claimed is:

1. An antenna structure, comprising:

a dielectric plate;

a patch antenna array;

a first feeding port;

a second feeding port; and four feeding structures;

wherein:

the dielectric plate and a metal bottom plate are spaced apart at a first preset distance;

the first feeding port and the patch antenna array are located on a first surface of the dielectric plate, the second feeding port is located on a second surface of the dielectric plate, the second surface being opposite the first surface;

the patch antenna array comprises four patch antennas, the four patch antennas being arranged in two rows and two columns, one of the feeding structures being comprised between two of the patch antennas in each row, and one of the feeding structures being comprised between two of the patch antennas in each column;

the feeding structure located between the two patch antennas in each column is connected to the first feeding port, so that the four patch antennas all generate polarization in a first direction; and the feeding structure located between the two patch antennas in each row is connected to the second feeding port, so that the four patch antennas all generate polarization in a second direction.

2. The antenna structure according to claim 1, wherein the first direction is orthogonal to the second direction.

3. The antenna structure according to claim 1, further comprising:

the metal bottom plate;

wherein the dielectric plate and the metal bottom plate are spaced apart at the first preset distance.

4. The antenna structure according to claim 1, wherein each of the four feeding structures comprises a dipole and a set of parallel feed lines that are connected;

wherein the parallel feed lines include a first feed line located on the first surface and a second feed line located on the second surface;

wherein the second feed line comprised in the feeding structure between the two patch antennas in each column is connected to the first surface through a corresponding through structure; and wherein the first feed line comprised in the feeding structure between the two patch antennas in each row is connected to the second surface through a corresponding through structure.

5. The antenna structure according to claim 4, wherein the through structure comprises one or more vias, each of the one or more vias being filled or plated with a conductive medium.

6. The antenna structure according to claim 4, wherein the four feeding structures comprise a first feeding structure, a second feeding structure, a third feeding structure, and a fourth feeding structure;

wherein the first feeding structure is located between the two patch antennas in the first column, the second feeding structure is located between the two patch antennas in the first row, the third feeding structure is located between the two patch antennas in the second column, the fourth feeding structure is located between the two patch antennas in the second row;

wherein the first feed line of the first feeding structure is connected to the first feed line of the third feeding structure;

wherein the second feed line of the first feeding structure is connected to the first surface through a first through structure;

wherein the second feed line of the third feeding structure is connected to the first surface through a third through structure, the first through structure and the third through structure being connected on the first surface;

wherein the second feed line of the second feeding structure is connected to the second feed line of the fourth feeding structure;

wherein the first feed line of the second feeding structure is connected to the second surface through a second through structure; and wherein the first feed line of the fourth feeding structure is connected to the second surface through a fourth through structure, the second through structure and the fourth through structure being connected on the second surface.

7. The antenna structure according to claim 4, wherein the dipole of each of the feeding structures comprises a first portion and a second portion;

wherein the first portion is located on the first surface, a first end of the first portion is connected to the first feed line, the first end of the first portion is a first input terminal of the dipole, and a second end of the first portion includes a first branch, the first branch and the patch antenna closest thereto being spaced apart at a second preset distance; and wherein the second portion is located on the second surface, a first end of the second portion is connected to the second feed line, the first end of the second portion is a second input terminal of the dipole, and a second end of the second portion includes a second branch, the second branch and the patch antenna closest thereto being spaced apart at the second preset distance.

8. The antenna structure according to claim 7, wherein input impedance of the dipole is a first impedance value, the input impedance of the dipole being impedance between the first input terminal and the second input terminal; and wherein an impedance value between the first feed line and the second feed line in each set of the parallel feed lines is the first impedance value.

9. The antenna structure according to claim 1, wherein each of the four feeding structures comprises a dipole and a set of parallel slot lines that are connected;

wherein the parallel slot lines comprised in the feeding structure between the two patch antennas in each column are both located on the first surface; and wherein the parallel slot lines comprised in the feeding structure between the two patch antennas in each row are both located on the second surface.

10. The antenna structure according to claim 9, wherein the four feeding structures comprise a first feeding structure, a second feeding structure, a third feeding structure, and a fourth feeding structure;

wherein the first feeding structure is located between the two patch antennas in the first column, the second feeding structure is located between the two patch antennas in the first row, the third feeding structure is located between the two patch antennas in the second column, and the fourth feeding structure is located between the two patch antennas in the second row;

wherein a first slot line of the first feeding structure is connected to a first slot line of the third feeding structure;

wherein a second slot line of the first feeding structure is connected to a second slot line of the third feeding structure;

wherein a first slot line of the second feeding structure is connected to a first slot line of the fourth feeding structure; and wherein a second slot line of the second feeding structure is connected to a second slot line of the fourth feeding structure.

11. The antenna structure according to claim 9, wherein the dipole of each of the feeding structures comprises a first portion and a second portion, the first portion and the second portion being located on a same surface;

wherein a first end of the first portion is connected to the first slot line, the first end of the first portion is a first input terminal of the dipole, a second end of the first portion includes a first branch, and the first branch and the patch antenna closest thereto are spaced apart at a second preset distance; and wherein a first end of the second portion is connected to the second slot line, the first end of the second portion is a second input terminal of the dipole, a second end of the second portion includes a second branch, and the second branch and the patch antenna closest thereto are spaced apart at the second preset distance.

12. The antenna structure according to claim 11, wherein input impedance of the dipole is a first impedance value, the input impedance of the dipole being impedance between the first input terminal and the second input terminal; and wherein an impedance value between the first slot line and the second slot line in each set of the parallel feed lines is the first impedance value.

13. The antenna structure according to claim 5, wherein the first branch and the second branch are T-shaped branches; or wherein the first branch and the second branch are triangular branches; or wherein the first branch and the second branch are semicircular branches.

14. The antenna structure according to claim 1, wherein the patch antennas comprised in the patch antenna array are square patch antennas; or wherein the patch antennas comprised in the patch antenna array are circular patch antennas; or wherein the patch antennas comprised in the patch antenna array are rhombic patch antennas.

15. The antenna structure according to claim 1, wherein the first surface and the second surface of the dielectric plate are squares, and side lengths of the first surface and the second surface are both a first preset length;

wherein a distance between geometric centers of the two patch antennas in a same column is a second preset length, and a distance between geometric centers of the two patch antennas in a same row is the second preset length; and wherein the second preset length is half of the first preset length.

16. An electronic device, comprising:

one or more antenna structures according to claim 1; and a first radio-frequency circuit;

wherein the one or more antenna structures are connected to the first radio-frequency circuit.

17. The electronic device according to claim 16, wherein the electronic device comprises a plurality of antenna structures, wherein at least two of the plurality of antenna structures have different operating frequency bands.

18. The electronic device according to claim 16, wherein the electronic device is a router.

19. A wireless network system, wherein the wireless network system comprises one or more electronic devices according to claim 16.

20. The wireless network system according to claim 19, further comprising:

one or more second electronic devices including an omnidirectional antenna.

* * * * *